US010108363B2

(12) United States Patent
Suetsugu et al.

(10) Patent No.: US 10,108,363 B2
(45) Date of Patent: Oct. 23, 2018

(54) STORAGE SYSTEM AND NOTIFICATION CONTROL METHOD

(71) Applicant: HITACHI, LTD., Tokyo (JP)

(72) Inventors: Michio Suetsugu, Tokyo (JP); Tomohiro Kawaguchi, Tokyo (JP); Hideo Saito, Tokyo (JP); Masaru Namba, Tokyo (JP)

(73) Assignee: HITACHI, LTD., Tokyo (JP)

( * ) Notice: Subject to any disclaimer, the term of this patent is extended or adjusted under 35 U.S.C. 154(b) by 225 days.

(21) Appl. No.: 15/304,609

(22) PCT Filed: Jul. 16, 2014

(86) PCT No.: PCT/JP2014/068873
§ 371 (c)(1),
(2) Date: Oct. 17, 2016

(87) PCT Pub. No.: WO2016/009504
PCT Pub. Date: Jan. 21, 2016

(65) Prior Publication Data
US 2017/0038995 A1 Feb. 9, 2017

(51) Int. Cl.
G06F 15/173 (2006.01)
G06F 3/06 (2006.01)

(52) U.S. Cl.
CPC .......... *G06F 3/0635* (2013.01); *G06F 3/0611* (2013.01); *G06F 3/0659* (2013.01); *G06F 3/0665* (2013.01); *G06F 3/0683* (2013.01)

(58) Field of Classification Search
None
See application file for complete search history.

(56) References Cited

U.S. PATENT DOCUMENTS

| 8,473,786 B2* | 6/2013 | Morimura | G06F 11/2257 714/26 |
|---|---|---|---|
| 2011/0004708 A1* | 1/2011 | Kondo | G06F 3/0614 710/38 |
| 2011/0066801 A1 | 3/2011 | Sato | |
| 2011/0179188 A1* | 7/2011 | Nakagawa | G06F 3/0613 709/240 |

(Continued)

FOREIGN PATENT DOCUMENTS

| JP | 2012-504793 A | 2/2012 |
|---|---|---|
| JP | 2014-048710 A | 3/2014 |

*Primary Examiner* — Natisha D Cox
(74) *Attorney, Agent, or Firm* — Volpe and Koenig, P.C.

(57) ABSTRACT

A storage system comprises multiple storage apparatuses and the multiple storage apparatuses provide a host system with a virtual volume in which multiple logical volumes are virtualized into one. When a first storage apparatus has detected a first event, the first storage apparatus changes the status of a first resource. Thereafter, the first storage apparatus sends a notice of the status change with respect to a first logical volume to a second storage apparatus comprising a second logical volume which is the basis of a virtual volume associated with the first logical volume, when the first storage apparatus has detected a second event which signifies that the host system is informed, in the future, of the status of the first resource. The second storage apparatus receives the notice and configures the status change based on the received notice.

15 Claims, 22 Drawing Sheets

(56) References Cited

U.S. PATENT DOCUMENTS

| | | |
|---|---|---|
| 2012/0023305 A1* | 1/2012 | Satoyama ............ G06F 3/0607 |
| | | 711/170 |
| 2012/0254657 A1 | 10/2012 | Kodaira |
| 2014/0068121 A1 | 3/2014 | Takakura et al. |
| 2016/0006810 A1 | 1/2016 | Chiba et al. |
| 2016/0011805 A1* | 1/2016 | Nakagawa ............ G06F 3/0619 |
| | | 711/114 |

* cited by examiner

FIG. 3

ALUA management table
211A

| LDEV number (401) | ALUA application status (402) |
|---|---|
| 01:01 | 0 |
| 01:02 | 1 |
| .... | .... |

FIG. 4

Pair management table
212A

| LDEV number (own storage) (501) | LDEV number (pair partner storage) (502) | Pair status (503) | I/O mode (504) | ALUA synchronous bit (505) |
|---|---|---|---|---|
| 01:01 | 02:01 | PAIR | Mirror | 0 |
| 01:02 | 02:02 | SUSPEND | Local | 0 |
| 01:03 | 02:03 | SUSPEND | Remote | 0 |
| 01:04 | 02:04 | SUSPEND | Block | 1 |
| .... | .... | .... | .... | .... |

FIG. 5

UA management table
213A

| Port number (601) | Host group number (602) | UA (603) |
|---|---|---|
| 01 | HG01 | 0 |
| 02 | HG02 | 1 |
| .... | .... | .... |

FIG. 6

UA synchronous flag bit list
262A

| LDEV number (701) | UA synchronous flag bit (702) |
|---|---|
| 01:01 | 0 |
| 01:02 | 1 |
| .... | .... |

FIG. 7

Path management table
214A

| Virtual box number (801) | HG number (802) | Relative port ID (803) | Path priority (804) |
|---|---|---|---|
| 01 | HG01 | 0x0000 | Active/optimized |
| 01 | HG02 | 0x0001 | Active/non-optimized |
| ... | ... | ... | ... |
| 02 | HG10 | 0x2000 | Active/optimized |
| 02 | HG11 | 0x2001 | Active/non-optimized |
| ... | ... | ... | ... |

FIG. 8

Port management table
215A

| Port number (1001) | Index number (1002) | LUN (1003) | LDEV number (1004) | HG number (1005) |
|---|---|---|---|---|
| 01 | 001 | 00 | 00:01 | HG01 |
| 01 | 002 | 01 | 00:02 | HG02 |
| ... | ... | ... | ... | ... |
| 02 | 001 | 11 | 11:11 | HG11 |
| 02 | 002 | 12 | 11:12 | HG12 |
| ... | ... | ... | ... | ... |

FIG. 9

Virtual box management table
216A

| Virtual box number | HG number | Port number | LDEV number |
|---|---|---|---|
| 01 | HG01 | 01 | 00:01 |
| 01 | HG02 | 02 | 00:02 |
| ... | ... | ... | ... |

FIG. 10

Relative port ID management table
217A

| HG number | Relative port ID |
|---|---|
| HG01 | 0x0001 |
| HG02 | 0x0002 |
| ... | ... |

FIG. 11

Valid ID range management table
218A

| Virtual box number | Beginning ID | Ending ID |
|---|---|---|
| 01 | 0x0001 | 0x1999 |
| 02 | 0x2000 | 0x2999 |
| ... | ... | ... |

| Virtual box number | HG number | Relative port ID | Path priority |
|---|---|---|---|
| 01 | HG01 | 0x0000 | Active/optimized |
| 01 | HG02 | 0x0001 | Active/optimized |
| 01 | ⋮ | ⋮ | |
| 01 | HG09 | 0x0999 | Active/optimized |
| 02 | HG10 | 0x2000 | Active/optimized |
| 02 | HG11 | 0x2001 | Active/optimized |
| ⋮ | | | |

214B

| Virtual box number | HG number | Relative port ID | Path priority |
|---|---|---|---|
| 01 | HG01 | 0x1000 | Active/non-optimized |
| 01 | HG02 | 0x1001 | Active/non-optimized |
| 01 | ⋮ | ⋮ | |
| 01 | HG09 | 0x1999 | Active/non-optimized |
| 02 | HG10 | 0x3000 | Active/non-optimized |
| 02 | HG11 | 0x3001 | Active/non-optimized |
| ⋮ | | | |

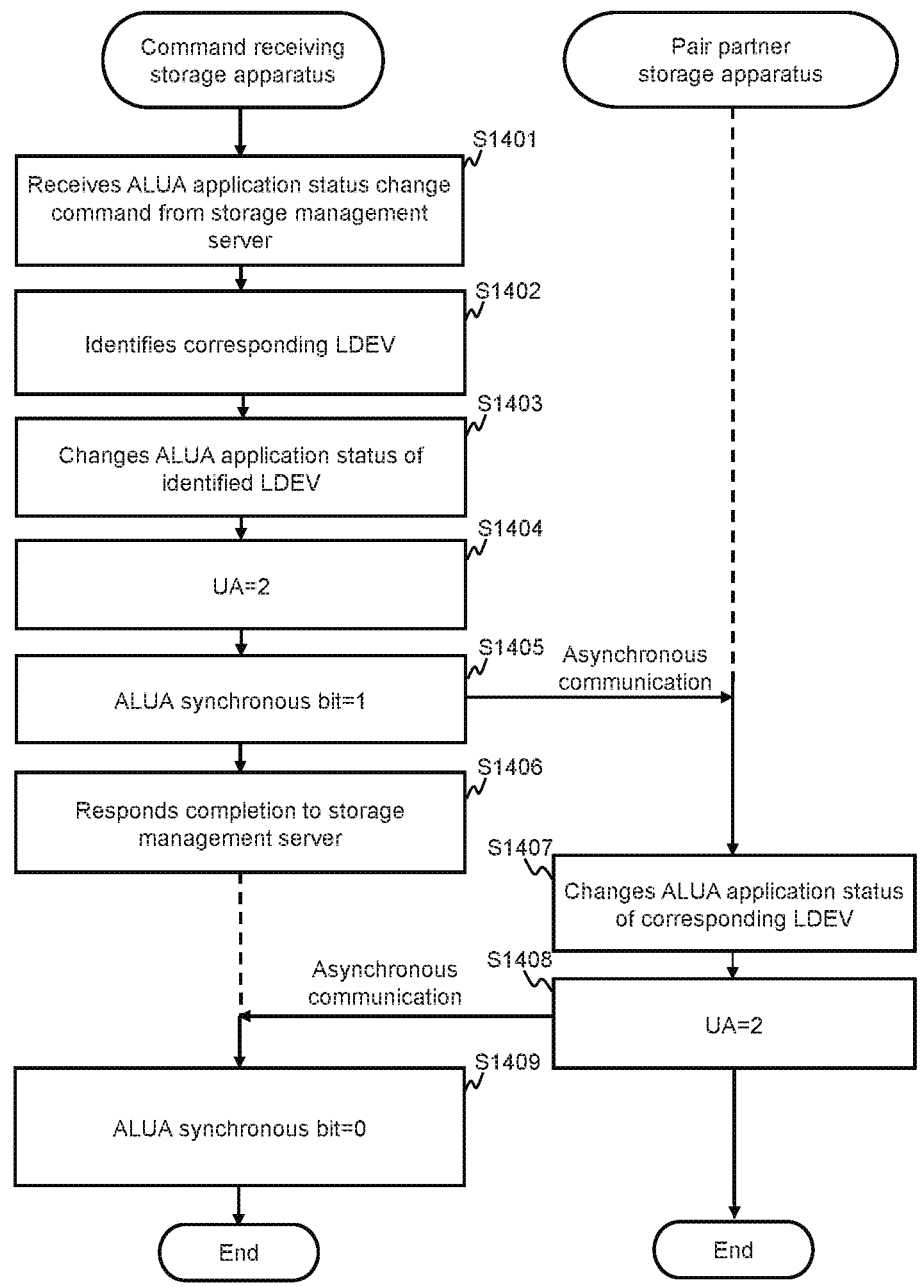

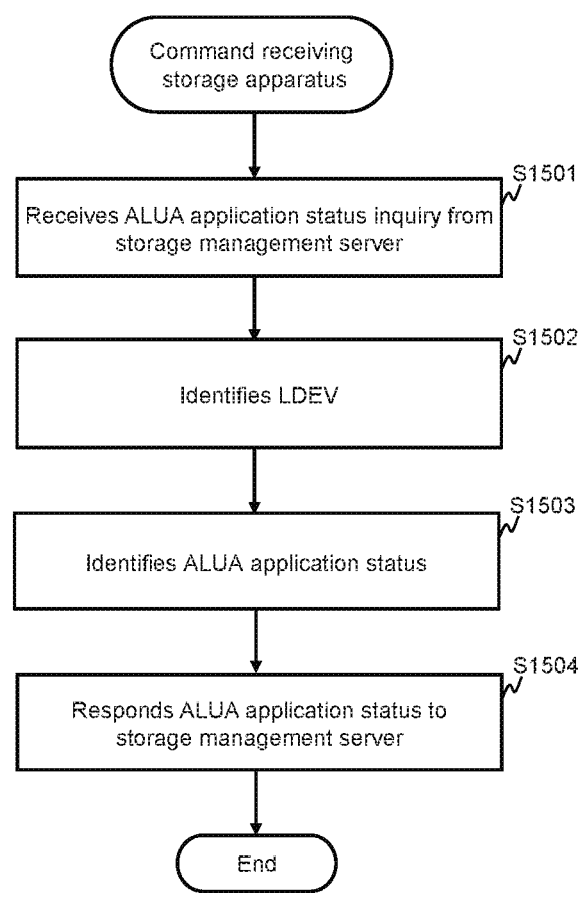

FIG. 25

Data center ID inquiry command

| Operation code | Data center ID |
|---|---|

FIG. 26

Path priority management table
102

| Storage serial number (2601) | Path status (2602) | Path priority (2603) |
|---|---|---|
| 11111 | Normal | Active/optimized |
| 22222 | Normal | Active/non-optimized |
| .... | .... | .... |

FIG. 27A

Data center ID management table
103A, 219A

| Data center ID | 0x0001 |
|---|---|

FIG. 27B

Data center ID management table
103B, 219B

| Data center ID | 0x0002 |
|---|---|

STORAGE SYSTEM AND NOTIFICATION CONTROL METHOD

TECHNICAL FIELD

The present invention generally relates to technology for controlling notification of information between multiple storage apparatuses which configure storage systems.

BACKGROUND ART

According to the Patent Literature 1, for example, one storage apparatus comprises two controllers and the judgment of using one controller out of the two is made, and the path priority is decided on the basis of the judgment result.

CITATION LIST

Patent Literature

[PTL 1] US2012/0254657

SUMMARY OF INVENTION

Technical Problem

Meantime, with respect to the identification of a path between a host system and a logical volume (a logical storage device with which a storage apparatus provides the host system), the protocol called ALUA (Asymmetric Logical Unit Access) has been well known. The host system (the initiator) can inquire about the path status (the priority, for example) on the logical volume (the target) by using the ALUA. Under the condition where the ALUA is used, one or more ports among multiple ports which the storage apparatus comprises can be defined as "target port group" (hereinafter, TPG).

Under the condition where the ALUA is used, when the status of one TPG is changed, the status change must be notified to TPG (hereinafter, related TPG) related to the TPG (hereinafter, the status changed TPG). When the status changed TPG and all the related TPGs are in the same storage apparatus, it is possible to notify the status change with respect to multiple TPGs by updating the configuration information common in the storage apparatus (for example, by updating the information with respect to each of all the related TPGs).

Alternatively, there are cases that the status changed TPG and at least one related TPG separately exist in two or more storage apparatuses, in a storage system which virtually provides multiple logical volumes respectively owned by multiple storage apparatuses to the host apparatus as one logical volume. In this case, the status change must be notified to the storage apparatus comprising the related TPG from the storage apparatus comprising the status changed TPG. As one of the structure to realize the notification for such status changes, it can be considered that each of all storage apparatuses maintains configuration information of all the storage apparatuses and synchronize the configuration information among all the storage apparatuses. However, the total amount of the configuration information becomes too large with such structure, and furthermore, the performance of the storage system as a whole is reduced in order for synchronizing the configuration information.

This kind of issue can happen in the case of virtualization of objects other than logical volumes. Also, this kind of issue can happen on a status change of resources other than TPGs and paths (for example, a priority change). In addition, this kind of issue can happen, not only to a storage system using ALUA, but to another kind of storage system comprising multiple storage apparatuses, for example, a storage system being configured to notify (to remind) a host system of the status change of a resource at any one of storage apparatuses by responding to the access from the host system, or to notify the post-changed status of resource to the host system in the case of receiving a predetermined kind of inquiry from the host system which has noticed the status change.

Solution to Problem

A storage system comprises multiple storage apparatuses. The multiple storage apparatuses manage multiple resources of multiple kinds including multiple logical volumes and provide a host system with a virtual volume which is a logical volume in which multiple logical volumes are virtualized into one. When a first storage apparatus (any one of the storage apparatuses) has detected a first event, the first storage apparatus changes the status of a first resource. After that, when the first storage apparatus has detected a second event, which signifies that the status of the first resource can be informed to the host system in the future, the first storage apparatus sends a status change notice which is a notice of a status change with respect to a first logical volume to a second storage apparatus which comprises a second logical volume, that is associated with the first logical volume and the basis of the virtual volume. The second storage apparatus receives the status change notice and configures the status change based on the received status change notice. In addition, the first resource is at least one of, a first logical volume which is a logical volume that the first storage apparatus comprises among multiple logical volumes that are the basis of the virtual volume (a logical volume in which multiple logical volumes are virtualized into one), and a resource (a path for example) which relate to the first logical volume and are managed by the first storage apparatus. Furthermore, a host system is one or more host apparatuses (for example, two or more host apparatuses configure a cluster). At least one host apparatus among one or more host apparatuses may be a physical host apparatus, and one or more host apparatuses may include a virtual host apparatus which is executed under physical host apparatuses.

Advantageous Effects of Invention

Each of all storage apparatuses maintains configuration information of the own storage apparatus, and also can notify a second storage apparatus which comprises a second logical volume that is associated with the first logical volume, of a change of status of the first resource which is the first logical volume or a resource related thereto and managed by the first storage apparatus, before the host system recognizes the status change, without synchronizing the configuration information between all the storage apparatuses.

BRIEF DESCRIPTION OF DRAWINGS

FIG. 3 shows a configuration of an ALUA management table.

FIG. 4 shows a configuration of a pair management table.

FIG. 5 shows a configuration of a UA management table.

FIG. 6 shows a configuration of a UA synchronous flag bit list

FIG. 7 shows a configuration of a path management table.

FIG. 8 shows a configuration of a port management table.

FIG. 9 shows a configuration of a virtual box management table.

FIG. 10 shows a configuration of a relative port ID management table

FIG. 11 shows a configuration of a valid ID range management table.

FIG. 13 schematically shows merging of path priorities of two different storage apparatuses.

FIG. 14 shows a flow of an ALUA application status change process.

FIG. 15 shows a flow of an ALUA application status confirmation process.

FIG. 25 shows a configuration of a data center ID inquiry command.

FIG. 26 shows s configuration of a path priority management table.

FIG. 27A shows a data center ID management table which is respectively comprised by a host apparatus and storage apparatus that belong to a first data center.

FIG. 27B shows a data center ID management table which is respectively comprised by a host apparatus and storage apparatus that belong to a second data center.

DESCRIPTION OF EMBODIMENTS

In the following explanation, information may be explained using an expression such as "aaa table", but these information may be expressed using other than data structures such as tables. For this reason, "aaa table" or the like may be called "aaa information" to show that the information is not dependent on data structures. In addition, the expression such as "ID" or "Number" is used when explaining contents of each of the information, but another kind of identification information may be used instead of these expressions.

Also, in the following explanation, there is a case to explain a processing by using a program as the doer of the action, but the doer of the processing may be a processor, since programs are executed by processors (for example, CPU (Central Processing Unit)), and perform a stipulated processing by appropriately using memory resources (for example, memories) and/or communication interfaces. The processing explained using a program as the doer of action may be the processing which is performed by a storage controller, a storage apparatus or a host apparatus including processors. Also, the processor may include hardware circuits to perform a part or all of the processing. Computer programs may be installed in a storage apparatus or a host apparatus from a program source. The program source may be, for example, either a program delivery server, or a computer-readable storage medium.

Also, in the following explanation, in a case where providing an explanation that distinguishes between like elements, a reference sign of the element will be used (for example, a storage apparatus 20A or a storage apparatus 20B), and in a case where providing explanation that does not distinguish between like elements, only a reference sign shared in common among the reference signs for the elements (for example, storage apparatus 20) will be used.

Hereinafter, some embodiments are explained by referring to drawings. It should be noted that ALUA (Asymmetric Logical Unit Access) will be referred to as embodiments below.

Embodiment 1

Figure 30:
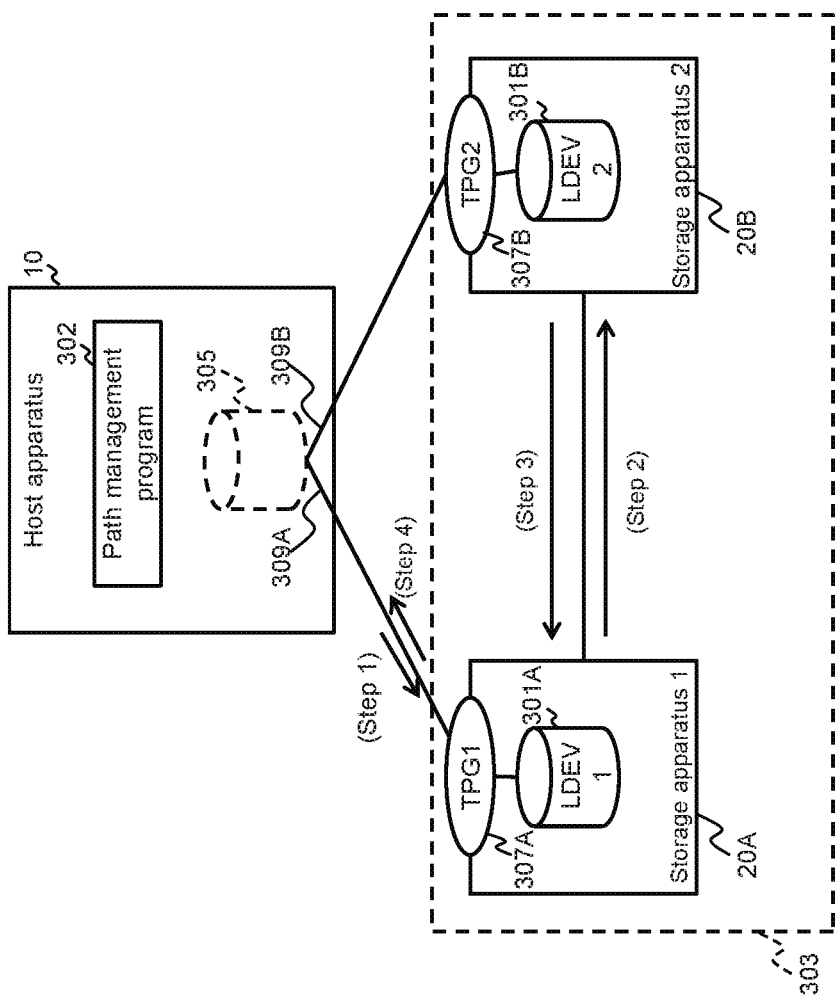
FIG. 30 shows an outline of a computer system according to Embodiment 1.

FIG. 30 shows an outline of a computer system according to Embodiment 1.

The computer system comprises a host apparatus 10 and a storage system 303 to which the host apparatus 10 is coupled. The host apparatus 10 is an example of a host system. The storage system 303 comprises storage apparatuses 20A and 20B. The storage apparatuses 20A and 20B are an example of multiple storage apparatuses. The number of storage apparatuses 20 may be three or more. In the following explanation, the storage apparatus 20A may be called "the first storage apparatus 20A" and the storage apparatus 20B may be called "the second storage apparatus 20B".

The storage apparatuses 20A and 20B manage multiple resources of multiple kinds including multiple LDEVs (Logical Storage Device) 301. The LDEV is a logical volume. As resources, other than LDEV, there are a target port group (TPG) 307 and a path 309 or the like. Each of TPGs 307A and 307B is single port in the present embodiment but may be an assembly of two or more ports. In addition, the LDEV 301 is a logical storage device and may be an actual LDEV or a virtual LDEV. The actual LDEV is a LDEV based on physical storage resources (for example, one or more physical storage devices). The virtual LDEV is based on a storage resource (for example, LDEV) of external storage apparatuses (no drawings) and may be an externally connected LDEV which complies with storage virtualizing technology, or may be a LDEV which is configured with multiple virtual pages (virtual storage areas) and complies with capacity virtualizing technology (typically, Thin Provisioning). In the present embodiment, it is regarded that each LDEV becomes the basis of any of VDEVs in order to make the explanation easy to understand.

The storage apparatuses 20A and 20B provide the host apparatus 10 with a VDEV (virtual volume) 305 which is a LDEV in which LDEVs 301A and 301B are virtualized into one. The host apparatus 10 acknowledges (for example, mounts) the VDEV 305.

The host apparatus 10 is a physical or a virtual computer and executes a path management program 302. The path management program 302 manages multiple paths 309 associated with the VDEV 305 which the host apparatus 10 has acknowledged. The path 309, through a TPG 307, is connected to the LDEV 301 which is associated with the TPG 307. In an example of FIG. 30, there is one path 309 in each LDEV 301 which is the basis of one VDEV 305, but one or more paths 309 may be needed per one LDEV 301, therefore, two or more paths 309 may be needed per one VDEV 305. The path management program 302 manages the priority of each path, and preferentially uses the higher priority path 309 over the lower priority path 309. For example, when the priority of a path 309A is higher than the priority of a path 309B, the path management program 302 preferentially uses the path 309A and sends an I/O (Input/Output) command to the storage system 303. The path priority is an example of the path status.

The priority of the path 309A is managed by each of the host apparatus 10 and the first storage apparatus 20A, and the priority of the path 309B is managed by each of the host apparatuses 10 and the second storage apparatus 20B. Each of storage apparatuses does not manage paths which are managed by other storage apparatuses. That is, the first storage apparatus 20A does not manage the priority of the path 309B which is managed by the second storage apparatus 20B, and the second storage apparatus 20B does not manage the priority of the path 309A which is managed by the first storage apparatus 20A. Therefore, in the present embodiment, all the storage apparatuses 20, respectively, maintain the path management information (information including path priority) on each of storage apparatuses, and also it is not necessary to synchronize the path management information among all the storage apparatuses.

In the condition here, for example, it is supposed that the priority of the path 309A has been changed in the first storage apparatus 20A. In a case where the path priority of the path 309A was changed, the first storage apparatus 20A, for example, configures a status change on the first LDEV 301A with which the path 309A is associated. An example of the status change is UA (Unit Attention) in the case of ALUA.

At this stage, the host apparatus 10 does not know yet that the path priority on the path 309A was changed. The host apparatus 10 does not grasp the detailed configuration of the storage system 303, and according to the ALUA, the storage system 303 makes the host apparatus 10 determine the path that the host apparatus 10 will use. Specifically, Because the storage system 303 informs the host apparatus 10 of the path priority, the host apparatus 10 can manage the path priority, therefore, choose the appropriate path 309. More specifically, the host apparatus 10 sends an inquiry on path priorities to the first storage apparatus 20A, and receives a response of the inquiry from the first storage apparatus 20A, and can realize the post-changed priority of the path 309A from the response. In ALUA, such inquiry is called Report-TargetPortGroups command (hereinafter, RTPG command) which is supported by SCSI.

When the storage apparatus 20A has received a RTPG command related to the VDEV 305 from the host apparatus 10 (Step 1), the storage apparatus 20A sends a status change notice and a path status request which is a request on status of a path associated with a second LDEV, to the second storage apparatus 20B which comprises the second LDEV 301B that configures a pair with a first LDEV 301A (Step 2). An example of status change notices is a UA synchronous flag bit list described further below. From the UA synchronous flag bit list, it is possible to know that on which LDEV that the first storage apparatus 20A comprises, the UA has been changed. An example of the path status requests is a path priority request which is a request of priorities of the paths that the second storage apparatus 20B manages.

The second storage apparatus 20B receives the UA synchronous flag bit list and the path priority request and configures UA, for example, on the second LDEV 301B that configures a pair with the first LDEV 301A based on the UA synchronous flag bit list, and also, responds to the first storage apparatus 20A on the path priority information including the information denoting the priority of the path 309B associated with the second LDEV 301B based on the path management information which the second storage apparatus 20B maintains (Step 3).

The first storage apparatus 20A receives the path priority information and sends a response (a RTPG response which is a response of RTPG command) that includes the first path priority which denotes the priority of one or more paths including the first path 309A associated with the first LDEV 301A and the second path priority which is the status of one or more paths including the second path 309B associated with the second LDEV 301B, to the host apparatus 10 (Step 4). That is, in the RTPG response, the path priorities of two storage apparatuses 20A and 20B are being merged. The host apparatus 10 (path management program 302) configures the first path priority and the second path priority included in the RTPG response to the path management information which the host apparatus 10 maintains, and hereafter, in the case of sending an I/O command with respect to the VDEV 305, chooses either 309A or 309B whichever has higher path priority based on the first path priority and the second path priority which the path management information denotes.

In the preceding process, the status change notice (UA synchronous flag bit list) from the first storage apparatus 20A to the second storage apparatus 20B is an example of informing the second storage apparatus 20B of a path priority change at the first storage apparatus 20A. According to the preceding process, each of all the storage apparatuses 20A and 20B maintains the path management information on the own storage apparatus 20A or 20B, and also, can inform the second storage apparatus 20B of a path priority change at the first LDEV 301A, without synchronizing the path management information among all of the storage apparatuses.

In addition, according to the preceding process, a notice of the path priority change is not performed at each path priority change in the first storage apparatus 20A but performed when RTPG commands are received. The receipt of the RTPG command is an example of detecting a second event which signifies that the host apparatus 10 can be informed, in the future, of a post-changed path priority. If a path priority change is informed at each of path priority changes, the load to the first storage apparatus 20A increases, and as the result, the performance of the storage system 303 could be reduced. According to the preceding process, such reduction of performance can be avoided. Also, as another example of the detection of a second event, as described further below, there is a receiving of an I/O command (the trigger to send UA, which denotes a path priority change, to the host apparatus 10).

In addition, in the present embodiment, a first path priority and a second path priority configured in RTPG are controlled by the first storage apparatus 20A (the storage apparatus which received a RTPG command) in accordance with the pair status which is the pair status of a first LDEV 301A and a second LDEV 301B, and the I/O modes on a first LDEV 301A and a second LDEV 301B (I/O mode is an example of I/O status). Thereby, the first storage apparatus 20A can make the host apparatus 10 choose the optimum path in accordance with the pair status and the I/O mode.

Specifically, in a case where the pair status is "PAIR" and the I/O mode is "Mirror", namely, if the first LDEV 301A and the second LDEV 301B are denoted being in a synchronous status, the first storage apparatus 20A takes a first path priority comprised in the RTPG response as the path priority being identified by the path management information maintained by the first storage apparatus, and the first storage apparatus 20A takes a second path priority comprised in the RTPG response as the path priority that is denoted by the path priority information received from the second storage apparatus 20B. In a case where the pair status is "SUSPEND" and the I/O mode is "Remote" (data in the second LDEV 301B is newer than data in the first LDEV 301A), the first storage apparatus 20A makes the second path priority higher than the first path priority (for example, the first path priority=Active/non-optimized and the second path priority=Active/optimized). In a case where the pair status is "SUSPEND" and the I/O mode is "Local" (data in the first LDEV 301A is newer than data in the second LDEV 301B), the first storage apparatus 20A makes the first path priority higher than the second path priority (for example, the second path priority=Active/non-optimized and the first path priority=Active/optimized). Thereby, the first storage apparatus 20A can make the host apparatus 10 choose the optimum path corresponding to the pair status and the I/O mode.

In addition, when the first storage apparatus 20A cannot communicate with the second storage apparatus 20B, the first storage apparatus 20A sends an error response to the host apparatus 10 as a RTPG response, if the pair status is "SUSPEND" and the I/O mode is "Remote", and on the other hand, the first storage apparatus 20A sends a RTPG response by making the first path priority Active/optimized without including the second path priority to the host apparatus 10, if the pair status is "PAIR" and the I/O mode is "Mirror", or the pair status is "SUSPEND" and the I/O mode is "Local". Thereby, the first storage apparatus 20A can make the host apparatus 10 execute the control in accordance with the communication status with the second storage apparatus 20B in addition to the pair status and the I/O mode.

The host apparatus 10 may regularly send a RTPG command or may send a RTPG command to the storage system 303 in the case of receiving UA (Unit Attention) from the storage system 303. When the first storage apparatus 20A has received an I/O command specifying the VDEV 305 (or the LDEV 301A or the 301B which is the basis of the VDEV 305) from the host apparatus 10, the first storage apparatus 20A executes I/O in accordance with the I/O command and sends an I/O response to the host apparatus 10, but if the UA configured in the first storage apparatus 20A has at least the value to denote a priority change, the first storage apparatus 20A configures the UA in the I/O response. The host apparatus 10 sends a RTPG command specifying the VDEV 305 (or the port associated with the VDEV305) which was specified by the I/O command at least to the first storage apparatus 20A when the UA in the response denotes a path priority change. That is, to send an I/O response including UA is one of the actions to remind the host apparatus 10 of a path priority change. Therefore, the first storage apparatus 20A sends a path priority change notice in the case of having received an I/O command (before sending an I/O response including UA to the host apparatus 10), to the storage apparatus 20B which is the pair partner (the storage apparatus 20B comprising the second LDEV 301B which configures a pair with the first LDEV 301A that is the basis of the VDEV specified by the received I/O command). Thereby, the storage apparatus 20B which is the pair partner is informed of the path priority change.

Also, in the present embodiment, in the first storage apparatus 20, a path priority change is performed by responding to a path priority change request (a request to change a path priority) from the management system of a storage system 303 (no drawing). The path priority change request is an example of a first event. The path priority changes can be performed with a unit larger than the unit of LDEVs, for example, the unit of TPGs, or the unit of host groups (host group is described further below). That is, the path priority changes are possible by one path priority change request, on each of the multiple LDEVs which are associated with the resources specified by the path priority change request. On the other hand, RTPG commands and also I/O commands are by a unit of LDEVs (a unit of LUN). For this reason, the first storage apparatus 20A may perform a notice of a path priority change (sending a status change notice) by a unit of LDEVs. That is, the first storage apparatus 20A may perform the notice of a path priority change with a smaller unit than the unit of the path priority change. Thereby, the reduction of load to the first storage apparatus 20A can be expected, therefore, the increase of the performance of the storage system 303 can be expected.

The preceding is the outline of Embodiment 1. In addition, the first storage apparatus 20A is representatively referred to as examples in the above explanation, but the processing of the first storage apparatus 20A explained in the present embodiment (and Embodiment 2) can be executed by each of other storage apparatuses 20.

Hereinafter, it is explanation on Embodiment 1 in details.

Figure 1:
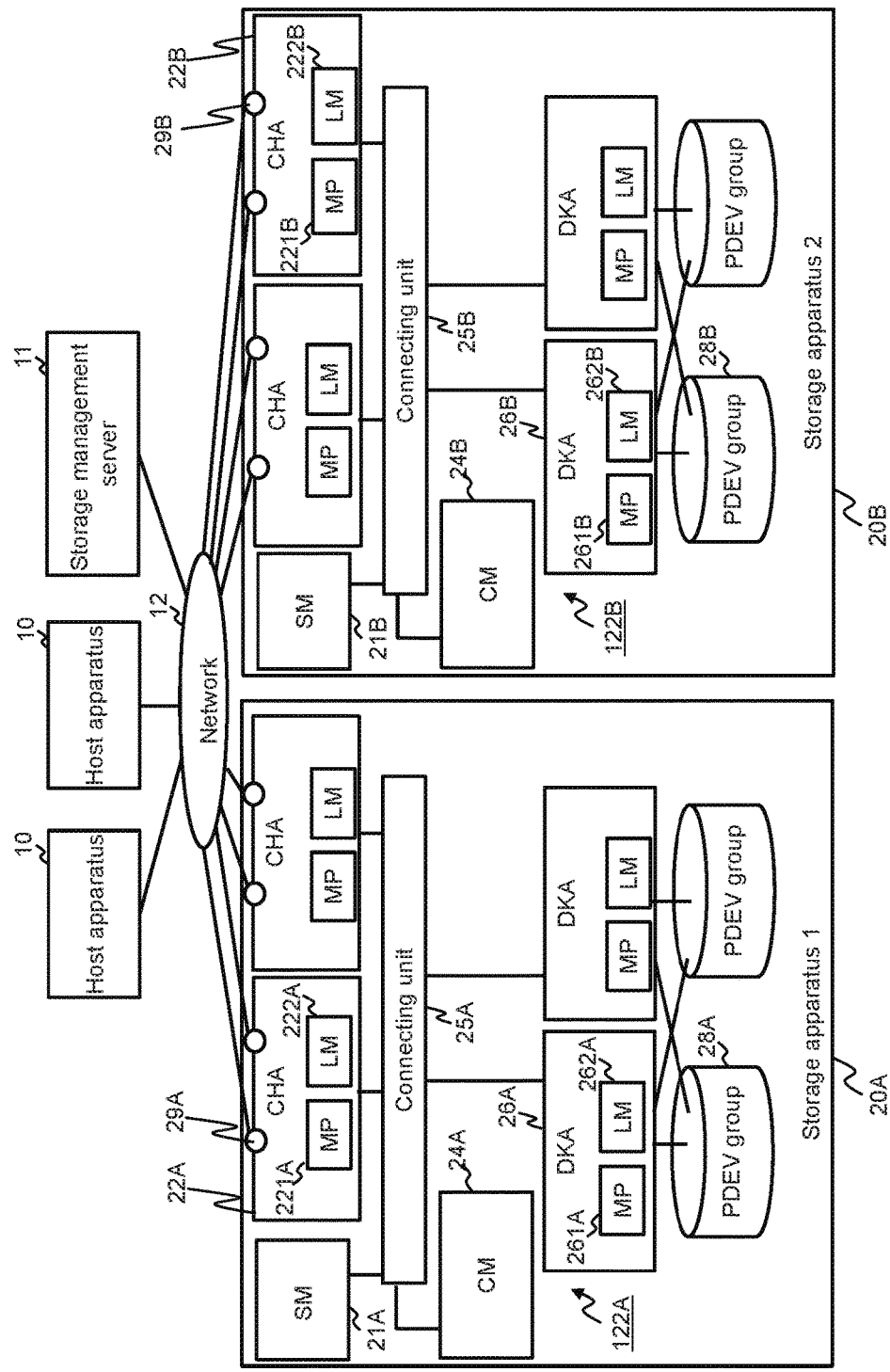
FIG. 1 shows a configuration of a computer system according to Embodiment 1.

FIG. 1 shows a configuration of a computer system according to Embodiment 1.

One or more host apparatuses 10 and a storage management server 11 are communicably coupled via multiple storage apparatuses 20A and 20B which configure a storage system and a communication network (for example a SAN (Storage Area Network)) 12. The storage management server 11 is an example of management systems. The management system can be configured with one or more computers. Specifically, for example, in a case where the management computer displays information (specifically, in a cases where the management computer displays on its own display device, or the management computer sends the information to be displayed to remote display computers), the management computer is the management system.

The host apparatus 10 comprises a communication interface device, a storage device, and processors coupled to these devices. The host apparatus 10 can communicate with storage systems 20 or the like via the communication interface device. The storage device is, for example a memory. The processor is, for example, a CPU and can execute programs stored in the storage device (for example, a path management program 302 (refer to FIG. 30), application programs and an operating system).

The configuration of a storage system is explained below by taking the storage apparatus 20A as an example out of the storages apparatuses 20A and 20B.

The storage apparatus 20A comprises one or more PDEV groups 28A and a storage controller 122A which controls I/O to one or more PDEV groups 28A.

The PDEV group 28A is a group of a set of one or more PDEVs, for example a RAID (Redundant Array of Independent (or Inexpensive) Disks). The PDEV signifies a non-volatile physical storage device, for example a HDD (Hard Disk Drive) or a SSD (Solid State Device). It is possible to configure an actual LDEV based on the PDEV group 28A.

The storage controller 122A comprises a FE I/F unit (Frontend Interface unit) to communicate with the host apparatus 10 and the storage management server 11, a BE I/F unit (Backend Interface unit) to communicate with one or more PDEV groups 28A, memory units and control units coupled to these units. The FE I/F unit is realized using one or more CHAs (Channel Adapter) 22A. The BE I/F unit is realized using one or more DKAs (Disk Adapter) 26A. The memory unit is realized using a SM (Shared Memory) 21A, a CM (Cash Memory) 24A, one or more LMs (Local Memory) 222A in one or more CHAs 22A and one or more LMs 262A in one or more DKAs 26A. The control unit is realized using one or more MPs (Micro Processor) 221A in one or more CHAs and one or more MPs 261A in one or more DKAs 26A. The SM 21A and the CM 24A may be of the areas respectively given on the same memory or may be different memories. The CHA 22A, the SM 21A, the CM 24A and the DKA 26A are communicable via the connecting unit (for example, buses or switches) 25.

One or more CHAs 22A comprise multiple ports 29A. The CHA 22A comprises a MP 221A and a LM (for example a volatile memory) 222A. The action of the CHA 22A is controlled by the MP 221A. The CHA 22A receives an I/O command from the host apparatus 10. When the received I/O command is a write command, data of write-target conforming to the write command will be temporarily stored in the CM 24A by the CHA 22A, and the data of write-target on the CM 24A will be written in the LDEV by the DKA 26A. When the received I/O command is a read command, data of read-target being read from the LDEV in accordance with a read command will be temporarily stored in the CM 24A by the DKA 26A, and the data of read-target on the CM 24A will be sent to the host apparatus 10 by the CHA 22A. The I/O command includes the number (for example, the LUN (Logical Unit Number)) of the LDEV of the I/O-destination (for example, the VDEV) and the address of the area with respect to the LDEV (for example the LBA (Logical Block Address)).

The DKA 26A comprises a MP 261A and a LM 262A. The action of the DKA 26A is controlled by the MP 261A. The DKA 26A controls I/O with respect to the LDEV (for example, the I/O of data with respect to the PDEV group 28A), and in so doing, controls the I/O of data with respect to the CM 24A.

The CM 24A is a volatile memory and/or a nonvolatile memory and the I/O-target data with respect to the LDEV is temporarily stored.

The SM 21A stores information such as port management information. Each of the CHA 22As and the DKA 26As, as needed, refers to the information in the SM21A, or stores at least a part of the information in the SM 21A in its own LMs (222A or 262A) and refers to the information stored in the LMs.

The process the storage apparatus 20A performs is performed by a storage controller 122A of the storage apparatus 20A.

Figure 2:
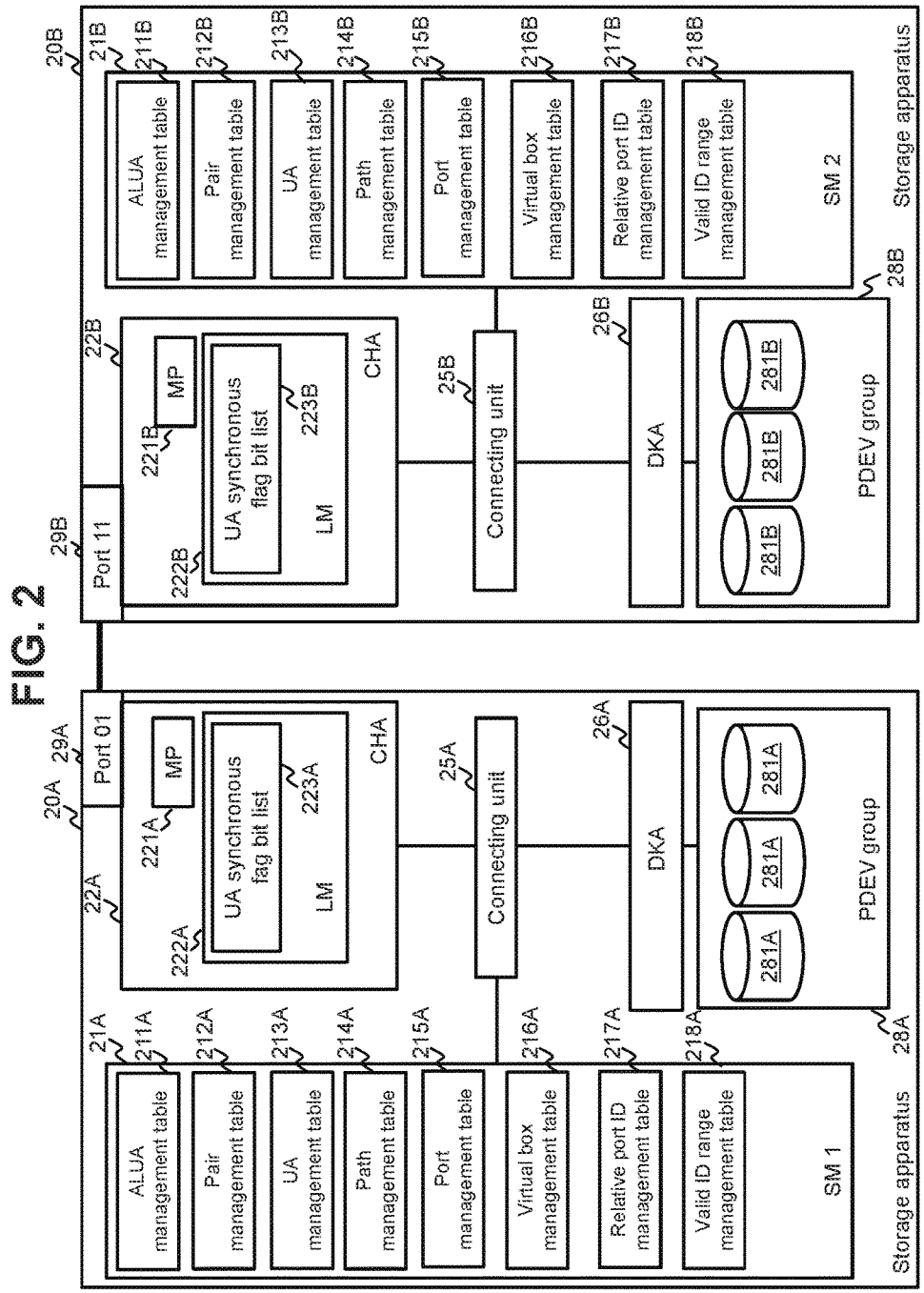
FIG. 2 shows a configuration of management information which each storage apparatus comprises.

FIG. 2 shows a configuration of the management information which each storage apparatus 20 comprises. In addition, the PDEV group 28, as shown in the drawing, is configured by one or more PDEVs 281. Hereinafter, the first storage apparatus 20A will be referred to as an example but it is the same in each of other storage apparatuses.

The management information which the first storage apparatus 20A maintains includes a ALUA management table 211A, a pair management table 212A, a UA management table 213A, a path management table 214A, a port management table 215A, a virtual box management table 216A, a relative port ID management table 217A, a valid ID range management table 218A and a UA synchronous flag bit list 223A. Two or more among these tables 211A to 218A and the list 223A may be merged into one, or each of at least one among these tables 211A to 218A and the list 223A may be divided into two or more. Also, in the present embodiment, the tables 211A to 218A are stored in the SM 21A and the UA synchronous flag bit list 223A is stored in the LM 222A of the CHA 22A, however, the list 223A may be stored in the SM 21A instead of or in addition to the LM 222A, and at least one of the tables 211A to 218A may be stored in the LM 222A instead of or in addition to the SM 21A. Hereinafter, by referring to FIG. 3 to FIG. 11, the tables 211A to 218A and the list 223A are explained.

FIG. 3 shows a configuration of the ALUA management table 211A.

The ALUA management table 211A comprises the information denoting whether or not an ALUA is applied per LDEV which the first storage apparatus 20A comprises. Specifically, the ALUA management table 211A comprises, per LDEV which the first storage apparatus 20A comprises, the following information, namely, a LDEV number (LDEV number of a LDEV) 401 and an ALUA application status 402 (whether or not an ALUA is being applied). For example, the ALUA application status "0" signifies that an ALUA is not applicable and the ALUA application status "1" signifies that an ALUA is applicable.

In addition, "LDEV number" is an identification number of LDEV which is not acknowledged by the host apparatus 10 but used in the storage apparatus 20. In addition to the LDEV number, a LUN (Logical Unit Number), which will be described further below, is associated with a LDEV. The LUN is acknowledged by the host apparatus 10 and included in an I/O command (specified by an I/O command). In the present embodiment, the same LUN is associated with LDEVs 301A and 301B which are the basis of a VDEV, therefore, the host apparatus 10 can acknowledge the LUN as the VDEV number. Each storage apparatus 20 can identify the LDEV of the I/O-destination by identifying the LDEV number corresponding to the LUN which is included in the I/O command.

FIG. 4 shows a configuration of the pair management table 212A.

The pair management table 212A comprises, per LDEV which the first storage apparatus 20A comprises and is being the basis of VDEVs, the information which denotes whether or not to inform the storage apparatus which is the pair partner of the LDEV which is the pair partner, the pair status, the I/O mode and the ALUA application status of the pair partner. Specifically, the pair management table 212A comprises, per LDEV which the first storage apparatus 20A comprises and is being the basis of VDEVs, the following information, namely, a LDEV number (own storage) 501 and a LDEV number (pair partner storage) 502, a pair status 503, a I/O mode 504 and an ALUA synchronous bit 505.

The LDEV number (own storage) 501 is a LDEV number which the first storage apparatus 20A comprises, for example a LDEV number of the first LDEV 301A. The LDEV number (pair partner storage) 502 is a number of the LDEV which configures a pair with a LDEV that the first storage apparatus 20A comprises (LDEVs which another storage apparatus comprise), for example a LDEV number of a second LDEV 301B which the second storage apparatus 20B comprises.

The pair status 503 denotes a status of a LDEV pair and, for example, there are the status such as "PAIR" (the status that when data is stored in one LDEV, the data is being copied to another LDEV) or "SUSPEND" (the status that although data is stored in one LDEV, the data is not copied to another LDEV) or the like.

The I/O mode 504 denotes mode (status) of I/O with respect to a LDEV pair (in other words, a VDEV), and there are, for example, "Mirror" (LDEVs which configure an LDEV pair being synchronized), "Local" (data in the LDEV in own storage is newer than data in the LDVE in the storage of the pair partner, thus an I/O to the LDEV in own storage is approved), "Remote" (data in the LDEV in the storage of the pair partner is newer than data in the LDEV in own storage, thus an I/O to the LDEV in own storage is inhibited and an I/O to the LDEV in the storage of the pair partner is approved) and "Block" (to respond an error to the host apparatus) or the like.

The ALUA synchronous bit 505 denotes whether or not to inform the storage apparatus of the pair partner of ALUA application status. For example, the ALUA synchronous bit "0" signifies that a change of an ALUA application status on the LDEV of the pair partner is not necessary and the ALUA synchronous bit "1" signifies that a change of an ALUA application status on the LDEV of the pair partner is necessary.

FIG. 5 shows a configuration of the UA management table 213A.

The UA management table 213A comprises UA per UA management unit. The UA management unit may differ depending on the kind of resources with respect to the status changes that the UA denotes. In the present embodiment, the UA denotes whether or not a path priority change is made, and the UA management unit is per port unit and host group unit. Specifically, the UA management table 213A comprises, per port 29A, the following information, namely, a port number 601, a host group number 602 and a UA 603.

The port number 601 is an identification number of a port 29A. The host group number 602 is a number of a host group associated with the port 29A. In addition, "host group" is a set of one or more host apparatuses 10 and a kind of resources associated with the ports of the storage apparatuses 20. The I/O via the port 29A is approved by the first storage apparatus 20A in a case where the host apparatus 10 at the I/O-source is the host apparatus 10 included in the host group associated with the port 29A.

The UA 603 denotes a value of UA, for example the UA "0" signifies there is no UA configuration, the UA "1" signifies path priority changes and the UA "2" signifies ALUA application status changes.

FIG. 6 shows a configuration of the UA synchronous flag bit list 223A.

The UA synchronous flag bit list 223A denotes, per LDEV which the first storage apparatus 20A comprises, whether or not UA of a path priority change (for example, the UA "1") was configured with respect to LDEVs of own storage in order to inform the pair partner storage of the UA on path priority changes. Specifically, the UA synchronous flag bit list 223A comprises, per LDEV which the first storage apparatus 20A comprises, the following information, namely, a LDEV number 701 and a UA synchronous flag bit 702. The LDEV number 701 is a number of LDEV which the first storage apparatus 20A comprises. The UA synchronous flag bit 702 denotes, whether or not UA of a path priority change was configured with respect to the LDEV. For example, the UA synchronous flag "0" signifies there is no path priority change and the UA synchronous flag "1" signifies there is a path priority change.

Changes of UA synchronous flags are performed without holding the receiving of I/O commands from the host apparatus 10, and also, the sending of status change notices (sending of UA synchronous flag bit lists) are performed asynchronously from the changes of UA synchronous flags. Thereby, the slowdown of the performance of the storage system can be avoided.

FIG. 7 shows a configuration of the path management table 214A.

The path management table 214A is an example of path management information and denotes path priorities per path management unit. The path management unit is per host group unit in the present embodiment. That is, in the present embodiment, path priorities are configured and/or changed per host group unit. Specifically, the path management table 214A comprises, per host group, the following information, namely a virtual box number 801, a HG number 802, a relative port ID 803 and a path priority 804.

The virtual box number 801 is a number of a virtual box and the virtual box is equivalent to a virtual storage system. The HG number 802 is a number of a host group.

The relative port ID 803 is an ID different from port numbers of the port 29As and the ID assigned in order not to duplicate port numbers in one virtual box (virtual storage system) (different storage apparatus 20A and 20B). A relative port can be called a virtual port.

As concrete values of the path priority 804, there are, for example, "Active/optimized" (a path priority is "high" and an execution of I/O can be performed), "Active/non-optimized" (a path priority is "low" and being in a waiting status) and "Unavailable" (I/O is impossible to perform) or the like.

In addition, in the present embodiment, path priorities can be managed with the following policy. That is, (1) The path priority of a host group in own storage which is managed by own storage is always of correct information. (2) The path priority of a host group in own storage which is managed by a storage of a pair partner, do not always have to be of correct information.

Furthermore, in the present embodiment, port numbers cannot be duplicated in the same storage apparatus. However, if a virtual box number is different, relative port IDs may be duplicated in the same storage apparatus. Also, if storage apparatuses are different in the same virtual box (virtual storage), port numbers may be duplicated. In addition, relative port IDs cannot be duplicated in the same virtual box (virtual storage).

FIG. 8 shows a configuration of the port management table 215A.

The port management table 215A denotes the information associated with each of ports 29A. Specifically, the port management table 215A comprises, per port 29A, the following information, namely, a port number 1001, an index number 1002, a LUN 1003, a LDEV number 1004 and a HG number 1005. The port number 1001 is a number of a port 29A. The index number 1002 is a serial number of the entry (LDEV) which can be associated with a port 29A. The LUN 1003 is a LUN (in the present embodiment, corresponds to a VDEV number) being associated with the LDEV associated with a port 29A. The LDEV number 1004 is a LDEV number associated with a port 29A. The HG number 1005 is a number of a host group associated with a port 29A.

FIG. 9 shows a configuration of the virtual box management table 216A.

The virtual box management table 216A denotes, per virtual box, resources which the first storage apparatus 20A manages. Specifically, the virtual box management table 216A comprises, per virtual box, the following information, namely, a virtual box number 1101, a HG number 1102, a port number 1003 and an LDEV number 1104. The virtual box number 1101 is a number of a virtual box. The HG number 1102 is a number of a host group associated with a port 29A in a virtual box. The port number 1003 is the number of a port 29 in a virtual box. The LDEV number 1104 is the number of an LDEV (an LDEV associated with a port 29A in a virtual box) in a virtual box.

FIG. 10 shows a configuration of the relative port ID management table 217A.

The relative port ID management table 217A denotes, per host group, relative port IDs for ports 29A associated with the host group. Specifically, the relative port ID management table comprises, per host group, the following information, namely, a HG number 1201 and a relative port ID 1202. The HG number 1201 is the number of a host group. The relative port ID 1202 is a relative port ID assigned to a port 29A with which the host group is associated.

It is possible to grasp correspondence relations between port numbers, LUNs, LDEV numbers and HG numbers by referring to the tables 215A to 217A which are shown in FIG. 8 to FIG. 10.

FIG. 11 shows a configuration of the valid ID range management table 218A.

The valid ID range management table 218A denotes, per virtual box, a range of the values (numbers) for relative port IDs which are possible to be given. Specifically, the valid ID range management table 218A comprises, per virtual box, a virtual box number 1301, a beginning ID 1302 and an ending ID 1303. The virtual box number 1301 is the number of a virtual box. The beginning ID 1302 is the first ID (value) within a relative port ID range which is possible to be given. The ending ID 1303 is the last ID (value) within a relative port ID range which is possible to be given.

The preceding is the explanation on the tables 211A to 218A and the list 223A. In addition, with respect to at least one among the tables 211A to 218A and the list 223A, another kind of information may be registered in place of or in addition to at least one kind of information. For example, an ID of a pair partner storage apparatus or the like may be registered to the pair management table 212A.

Figure 12:
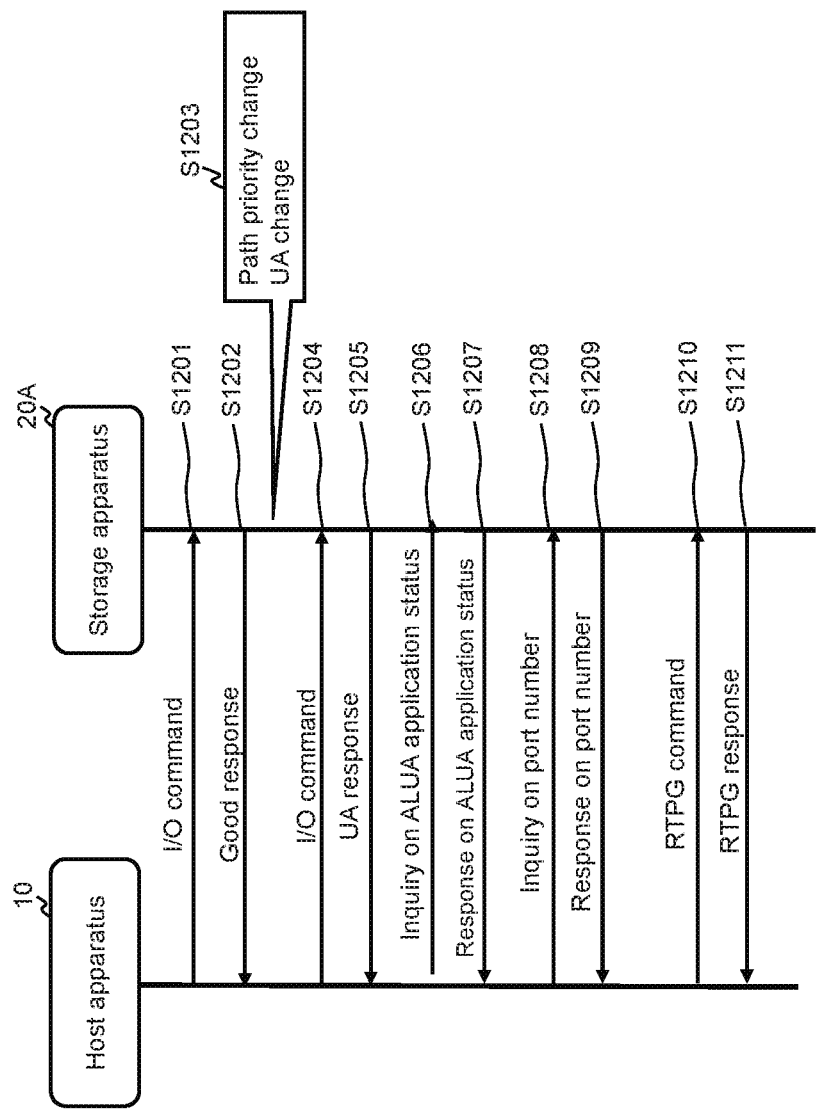
FIG. 12 shows a flow until a host apparatus grasps the path priority of a storage apparatus.

FIG. 12 shows a flow until the host apparatus 10 grasps path priorities of the storage apparatuses 20.

The host apparatus 10 sends an I/O command including a LUN of a first LDEV 301A to the first storage apparatus 20A via a path 309A. When the first storage apparatus 20A received an I/O command (S1201), the first storage apparatus 20A performs I/O in accordance with the I/O command and sends Good response to the host apparatus 10, if the UA management table 213A (refer to FIG. 5) with respect to the first LDEV 301A which is identified from the LUN of the I/O command is "0" (S1202). This is because, there is no UA configuration on the first LDEV 301A.

Thereafter, with respect to the host group with which the first LDEV 301A is associated, a path priority is changed, and accordingly, the UA "1" is configured by the storage apparatus 20A in the UA management table 213A (refer to FIG. 5) with respect to the host group, and also the UA synchronous flag "1" is supposed to be configured in the UA synchronous flag bit list 223A (refer to FIG. 6) with respect to the first LDEV 301A (S1203).

Thereafter, once again, it is supposed that the first storage apparatus 20A has received the I/O command including the LUN of the first LDEV 301A via the path 309A (S1204). In this case, since the UA of the host group with which the first LDEV 301A is associated is "1" (to be exact, the UA is other than "0"), the first storage apparatus 20A sends a response including the UA "1" to the host apparatus 10 after performing the I/O in accordance with the I/O command (S1205).

The host apparatus 10 notices that there was a change of a path priority on the LUN in the I/O command of S1204 when the host apparatus 10 received a response including the UA "1". The host apparatus 10 sends an ALUA application status inquiry including the same LUN as the LUN in the I/O command of S1204 to the first storage apparatus 20A. When the first storage apparatus 20A received the ALUA application status inquiry including the LUN (S1206), the first storage apparatus 20A sends a response including the ALUA application status which the ALUA application status 402 (refer to FIG. 3) denotes with respect to the first LDEV 301A corresponding to the LUN, to the host apparatus 10 (S1207).

When the host apparatus 10 identified that an ALUA has been applied from the response, the host apparatus 10 sends a port number inquiry including the same LUN as the LUN in the I/O command of S1204 to the first storage apparatus 20A. When the first storage apparatus 20A received the port number inquiry including the LUN (S1208), the first storage apparatus 20A identifies the port numbers corresponding to the LUN from the port management table 215A and sends an response including the identified port numbers to the host apparatus 10 (S1209).

The host apparatus 10 sends a RTPG (ReportTargetPort-Groups) command including the same LUN as the LUN in the I/O command of S1204. When the first storage apparatus 20A received the RTPG command (S1210), the first storage apparatus 20A performs the process explained by referring to FIG. 30. And as such, as shown in FIG. 13 for example, the relevant part (all of the information in the thick-bordered box in FIG. 13) of the different path management tables 214A and 214B of the different storage apparatuses 20A and 20B will be merged into the RTPG response. Specifically, the first storage apparatus 20A configures a group of relative port ID and path priority in the path management table 214A and a group of relative port ID and path priority in the path management table 214B, in the RTPG response. The first storage apparatus 20A identifies the identified port numbers corresponding to the LUN in the RTPG command from the port management table 215A, the relative port ID management table and the virtual box management table, and may configure the identified port numbers to the RTPG response. The first storage apparatus 20A send the RTPG response to the host apparatus 10 (S1211). Thereby, the host apparatus 10 can acknowledge the post-changed path priority.

Hereinafter, the process performed in the present embodiment will be explained. In addition, hereinafter, to make the explanation easy to understand, a command receiving storage apparatus is regarded as the first storage apparatus 20A and a pair partner storage is regarded as the second storage apparatus 20B. The command receiving storage apparatus is a storage apparatus which receives commands (I/O commands or some other inquiries) from the storage management server 11 or the host apparatus 10. The pair partner storage is a storage apparatus which comprises the LDEV that configures a pair with an LDEV that relates to the command which the command receiving storage apparatus has received.

FIG. 14 shows a flow of the ALUA application status change process.

The first storage apparatus 20A receives an ALUA application status change command from the storage management server 11 (S1401). The ALUA application status change command includes a HG number. Hereinafter, the HG number will be referred to as "the target HG number" in the explanation in FIG. 14.

The first storage apparatus 20A identifies the LDEV corresponding to the target HG number from the port management table 215A (S1402). The first storage apparatus 20A changes the ALUA application status 402 (refer to FIG. 3) of the identified LDEV in accordance with the command received in S1401 (S1403). Also, the first storage apparatus 20A changes the UA 603 (refer to FIG. 5) corresponding to the target HG number to "2" (the value signifying a change of an ALUA application status) (S1404). In addition, the first storage apparatus 20A changes the ALUA synchronous bit 505 (refer to FIG. 4) corresponding to the LDEV which was identified in S1402 to "1" (the value signifying a change of an ALUA application status) (S1405). And, the first storage apparatus 20A sends a completion response as the response of the command received in S1401 to the storage management server 11 (S1406).

Asynchronously with S1405, the first storage apparatus 20A sends a change notice including the number of the LDEV in which the ALUA synchronous bit 505 is "1", to the second storage apparatus 20B. The change notice includes the number of the LDEV of the first storage apparatus 20A (or the LUN), or the number of the LDEV of the pair partner of the LDEV. The second storage apparatus 20B changes the ALUA application status (the ALUA application status of the ALUA management table 211A) corresponding to the LDEV that the change notice denotes, to "1" (S1407). Also, the second storage apparatus 20B changes the UA (UA 603 of UA management table 213B) corresponding to the target HG number in the change notice to "2" (S1408). The second storage apparatus 20B, asynchronously with S1408, sends a completion notice with respect to the change notice to the first storage apparatus 10A after S1408 is completed. The completion notice may include the number of the LDEV in which the change of the ALUA application status has been completed (the number of the LDEV of the second storage apparatus 20B), or the number of the LDEV of the pair partner of the LDEV (the number of the LDEV of the first storage apparatus 20A).

The first storage apparatus 20A changes the ALUA synchronous bit 505 (refer to FIG. 4) when the first storage apparatus 20A received the completion notice, that is, when the change of the ALUA application status is completed in the second storage apparatus 20B, to "0" (S1409).

Furthermore, in a case where a pair is not configured between the LDEVs which become the basis of a VDEV, it is not necessary to change the ALUA synchronous bit to "1" on each LDEV which becomes the basis of a VDEV.

FIG. 15 shows a flow of the ALUA application status confirmation process.

The first storage apparatus 20A receives an ALUA application status inquiry from the storage management server 11 (S1501). The ALUA application status inquiry includes a HG number. Hereinafter, the HG number will be referred to as "the target HG number" in the explanation of FIG. 15.

The first storage apparatus 20A identifies LDEVs which correspond to the target HG number from the port management table 215A (S1502). The first storage apparatus 20A identifies the ALUA application status 402 (refer to FIG. 3) of the identified LDEV, in accordance with the received inquiry in S1501 (S1503).

The first storage apparatus 20A sends a response including the identified ALUA application status to the storage management server 11 (S1504).

In addition, the ALUA application status included in the response sent in S1504 is also the ALUA application status of the LDEV which configures a pair with the LDEV identified by S1502. This is because, by the process shown in FIG. 14, the ALUA application status of the pair partner LDEV is also changed to the same status. Therefore, the administrator (the user of the storage management server 11) may confirm the ALUA application status on one LDEV out of two LDEVs that configure a LDEV pair.

Figure 16:
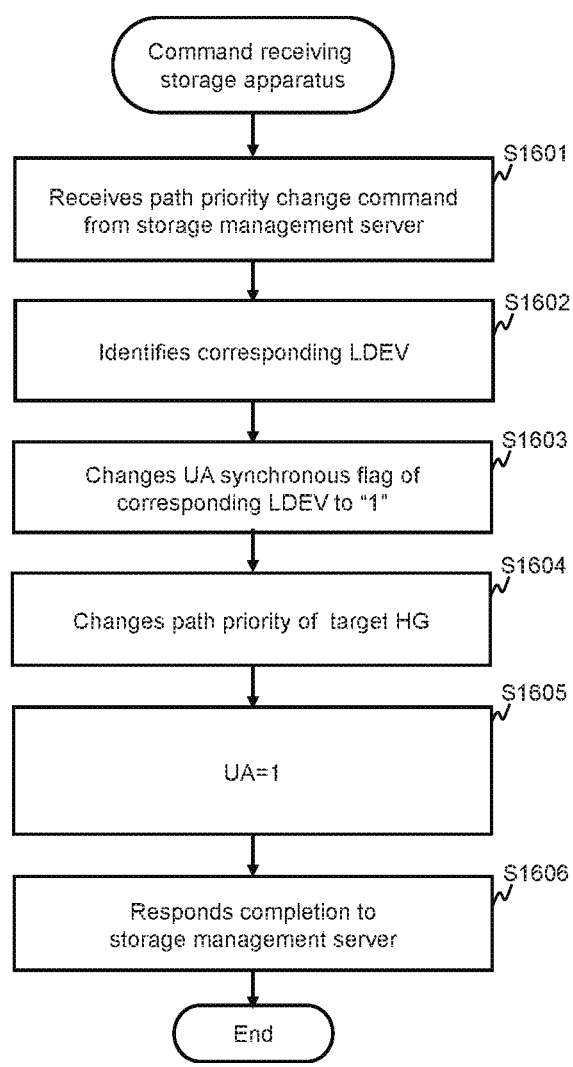
FIG. 16 shows a flow of a path priority change process.

FIG. 16 shows a flow of the path priority change process.

The first storage apparatus 20A receives a path priority change command from the storage management server 11 (S1601). The path priority change command includes a HG number. Hereinafter, the HG number will be referred to as "target HG number" in the explanation of FIG. 16.

The first storage apparatus 20A identifies the LDEV corresponding to the target HG number from the port management table 215A (S1602). The first storage apparatus 20A changes the UA synchronous flag bit 702 (refer to FIG. 6) of the identified LDEV to "1" (the value signifying a path priority change) (S1603). The first storage apparatus 20A changes the path priority 804 (refer to FIG. 7) corresponding to the target HG number in accordance with the received command in S1601 (S1604). The first storage apparatus 20A changes the UA 603 (refer to FIG. 5) corresponded to the target HG number to "1" (the value signifying a path priority change) (S1605).

The first storage apparatus 20A sends the response denoting the completion to the storage management server 11 (S1606)

In addition, as described above, in a case where the UA with the value which signifies a path priority change is existing, each storage apparatus 20 sends an I/O response including the UA (the response of I/O command), when each storage apparatus 20 receives an I/O command which treats the LDEV corresponding to the UA as the I/O-destination. However, even if the second storage apparatus 20B (the pair partner storage apparatus) would have received such I/O command during the path priority change process, the storage apparatus 20B does not send the I/O response including the UA. This is because the second storage apparatus 20B has not acknowledged the UA change yet. However, it is not an issue due to the following reasons.

(1) Not informing the UA change to the second storage apparatus 20B after a path priority change, signifies that the first storage apparatus 20A has not received the I/O command which specifies the LDEV relating to the UA change after the path priority change. Accordingly, the data in two LDEVs which configures an LDEV pair relating to the UA change is the same at this point. Therefore, the data may be read from either LDEV.

(2) After the path priority change, when the first storage apparatus 20A receives an I/O command, the first storage apparatus 20A sends an I/O response including UA to the host apparatus 10. Thereby, the host apparatus 10 can acknowledge that there was a change of path priority and can confirm by the RTPG command which path priority has been changed.

(In addition, before a UA change notice (transmission), even though the second storage apparatus 20B received a write command and data in the LDEV (the LDEV of the pair partner) in the second storage apparatus 20B was renewed by doing so, it is not an issue due to the following reason. That is, due to the synchronous copy, when the second storage apparatus 20B received a write command specifying the LDEV without having a UA configuration, a write data will be transmitted from the second storage apparatus 20B to the first storage apparatus 20A which comprises the LDEV (the LDEV with a UA configuration) that is a pair with the LDEV without having a UA configuration. The storage apparatus 20A, upon finding the write data transmission from the second storage apparatus 20B, executes the UA transmission in FIG. 17. Thereby, the UA is transmitted to the LDEV without having a UA configuration (the second storage apparatus 20B) as well and the second storage apparatus 20B can return the UA to the host apparatus 10. In this case, S1701 in FIG. 17 (receipt of I/O command from the host apparatus 10) can be read as "receiving of the copy command from the second storage apparatus 20B" instead.)

Figure 17:
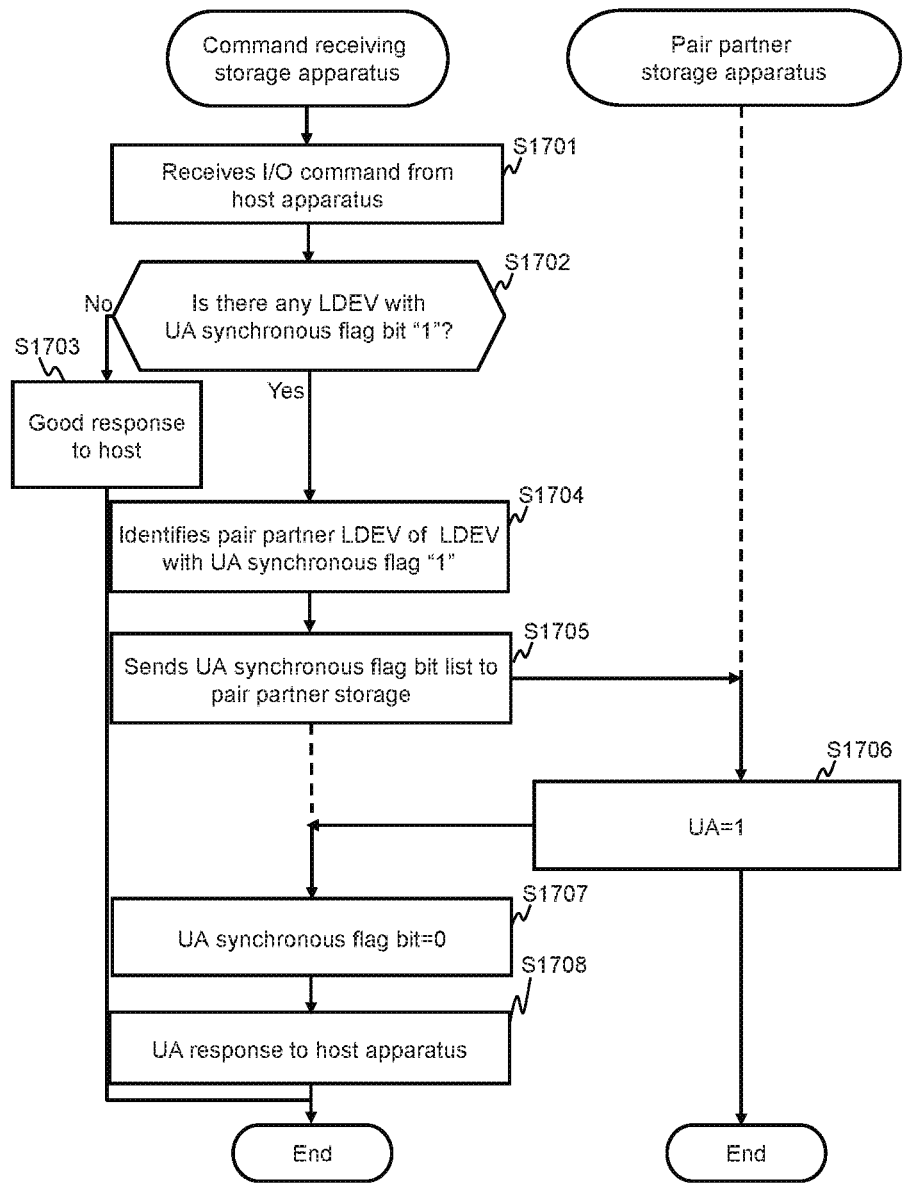
FIG. 17 shows a flow of UA transmission on an I/O process.

FIG. 17 shows a flow of the UA transmission on an I/O processing.

The first storage apparatus 20A receives an I/O command from the host apparatus 10 (S1701). The I/O command includes a LUN.

The first storage apparatus 20A judges based on the UA synchronous flag bit list 223A (refer to FIG. 6), whether or not any LDEV in which the UA synchronous flag bit 702 is "1" exists. (S1702).

In a case where the result of the judgment on S1702 is negative (S1702: No), the first storage apparatus 20A sends Good response (I/O response denoting Good) to the host apparatus 10 (S1703).

Alternatively, in a case where the result of the judgment on S1702 is affirmative (S1702: Yes), the first storage apparatus 20A identifies, based on the pair management table 212A, the pair partner LDEV of the LDEV of the UA synchronous flag bit "1" (S1704). In addition, even though the UA synchronous flag bit on the I/O-destination LDEV (the LDEV corresponding to the LUN in the I/O command) is "0", if at least one UA synchronous flag bit on the UA synchronous flag bit list 223A is "1", the result of the judgment in S1702 is affirmative. In addition, in S1704, one or more pair partner LDEVs are identified with respect to one or more LDEVs in which the UA synchronous flag is "1", and S1705 to S1707 described further below on each of one or more storage apparatuses which comprise one or more identified pair partner LDEVs, will be performed. In order to make the explanation easy to understand, it is supposed here that there is one LDEV in which the UA synchronous flag is "1", therefore the pair partner LDEV is also one and the pair partner storage apparatus is the second storage apparatus 20B.

The first storage apparatus 20A sends the UA synchronous flag bit list 223A to the second storage apparatus 20B which comprises the pair partner LDEV identified in S1704 (S1705). That is, the first storage apparatus 20A informs the second storage apparatus 20B of a UA change on the first storage apparatus 20A. In addition, the UA synchronous flag bit list 223A to be sent, is the list 223A on the LM 222A in the CHA 22A which received the I/O command. The contents of the lists 223A may be same among all CHAs 22A. Or, if the accessible LDEVs (the LDEVs which can be specified as I/O-destinations by the receiving I/O commands) are different depending on CHAs 22A, the contents of the lists 223A may be different depending on CHAs 22A.

The second storage apparatus 20B receives the UA synchronous flag bit list 223A and identifies the LDEVs in which the UA synchronous flag bit is "1" from the received list 223A, and identifies he LDEV which configures a pair with the identified LDEV based on the pair management table 212B, and identifies the HG number associated with the identified LDEV based on the port management table 215B and changes the UA corresponding to the identified HG number (the UA on the UA management table 213B) to "1" (the value signifying a path priority change) (S1706). Thereby, the UA change on the first storage apparatus 20A has been informed to the second storage apparatus 20B (notice completion). The second storage apparatus 20B sends the completion to the first storage apparatus 20A.

When the first storage apparatus 20A has received the notice of completion from the second storage apparatus 20B, the first storage apparatus 20A changes all the UA synchronous flag bit "1" on the UA synchronous flag bit list 223A to "0" (S1707). Then, the first storage apparatus 20A sends the UA response (the I/O response including UA=1) to the host apparatus 10 (S1708).

According to the processing in FIG. 17, even though the UA synchronous flag bit of the I/O-destination LDEV is "0", the UA response will be sent to the host apparatus 10 if only the UA synchronous flag bit of at least one of other LDEVs is "1". However, it is not always necessary, and for example the following variations can be considered.

(Variation 1)

In S1702, the first storage apparatus 20A judges whether or not the UA synchronous flag bit of the I/O-destination LDEV is "1". In a case where the UA synchronous flag bit of the LDEV of the I/O-destination is "0", even though the UA synchronous flag bit of at least one of other LDEVs is "1", the judgment result of S1702 will be negative, in a case where the UA synchronous flag bit of the LDEV of the I/O-destination is "1", the judgment result of S1702 is affirmative. In this Variation 1, in a case where the judgment result of S1702 is affirmative, the UA synchronous flag bit sent in S1705 may be only the UA synchronous flag bit corresponded to the I/O destination LDEV. The UA synchronous flag bit which will be changed to "0" in S1707, may be only the bit corresponded to the I/O-destination LDEV.

(Variation 2)

In a case where the judgment result of S1702 is affirmative, the UA synchronous flag bit sent in S1705 is only the UA synchronous flag bit corresponded to the LDEV associated with the HG which includes the sending-source host apparatus of the I/O command among the UA synchronous flag bit list 223A.

Figure 18A:
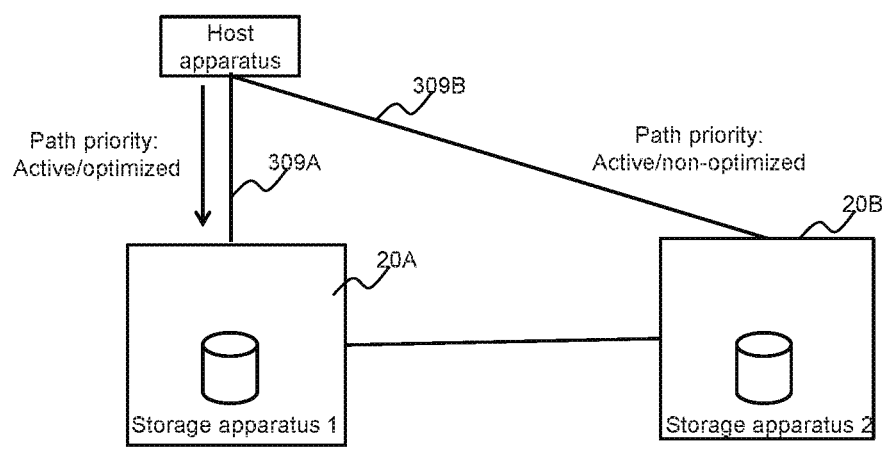
FIG. 18A shows an example of priority paths and access routes in the case of pair status "PAIR".
Figure 18B:
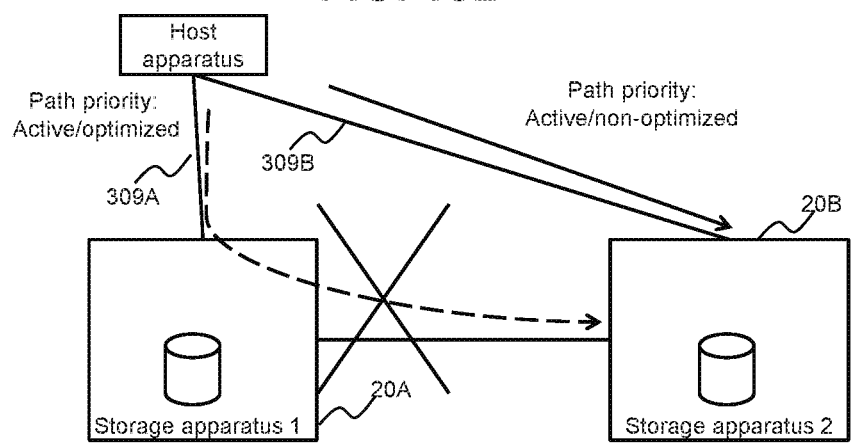
FIG. 18B shows an example of priority paths and access routes in the case of pair status "SUSPEND".

FIG. 18A and FIG. 18B shows examples of the relevance between pair status and path priority. Specifically, FIG. 18A shows an example of an appropriate path in the case of the pair status "PAIR", and FIG. 18B shows an example of an appropriate path in the case of the pair status "SUSPEND".

As shown in FIG. 18A, in the case of the pair status "PAIR" (and also the I/O mode "Mirror"), the host apparatus 10 uses the path 309A according to the path priorities of the path management table, namely it is desirable to perform I/O to the LDEV of the first storage apparatus 20A.

However, in a case where the pair status is changed, for example as shown in FIG. 18B, to the pair status "SUSPEND" (and also the I/O mode "Remote"), the host apparatus 10 uses the path 309B regardless of the path priorities of the path management table, namely, it is desirable to perform I/O to the LDEV of the second storage apparatus 20B. Therefore, in this case, it is desirable that path priorities are changed to the path priority "Active/non-optimized" on the path 309A and the path priority "Active/optimized" on the path 309B. In the present embodiment, the host apparatus 10 can acknowledge path priorities by the following flow.

(1) Depending on a pair status, path priorities managed by a storage apparatus will be changed.

(2) UA will be configured also in the case of a path priority change caused by a pair status change. Specifically, the UA will be transmitted by the process in FIG. 17, when an UA change event (S1701 of FIG. 17) such as a receiving of an I/O command is performed after the process of FIG. 19 was performed.

(3) A host apparatus 10 acknowledges a path priority change by a UA response.

(4) A host apparatus 10 acknowledges the path priority by sending a RTPG command. (In addition, as shown with a dashed arrow in FIG. 18B, it is possible to perform I/O to an LDEV of the second storage apparatus 20B via the path 309A but the performance will be lower than the use of the path 309B.)

Consequently, in the present embodiment, a storage apparatus which changed a pair status (for example, 20A) changes the value of UA to "1" (the value signifies the path priority change) according to the change of a pair status. In the case of the UA "1", as explained further below, the first storage apparatus 20A will receive a RTPG command from the host apparatus 10 in the due course, though, with respect to the path priority report process including a receipt of RTPG command, a RTPG response which includes a report denoting path priorities corresponding to pair status and I/O modes is made and sent to the host apparatus 10. Thereby, the path priority which is denoted by the path management information maintained by the host apparatus 10, is changed to the path priority corresponding to the pair status and the I/O modes, and thereafter, the paths will be used by the host apparatus 10 based on the post-changed path management information.

Figure 19:
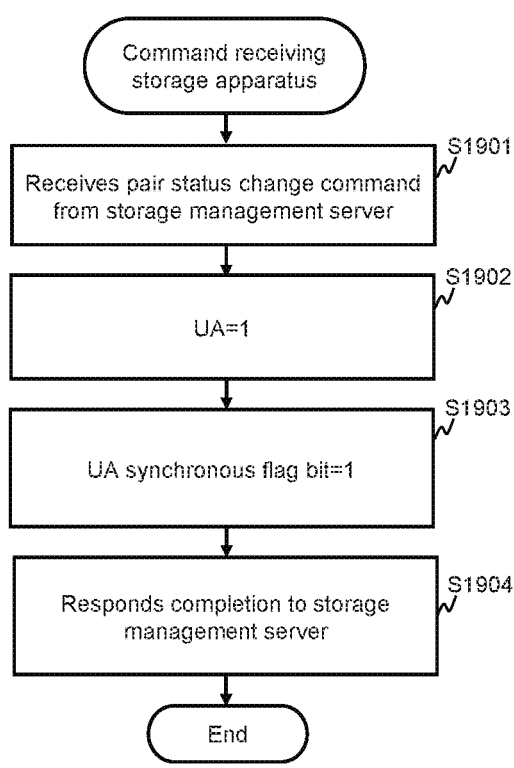
FIG. 19 shows a flow of a path priority change process.

FIG. 19 shows a flow of the path priority change process.

The first storage apparatus 20A receives a pair status change command from the storage management server 11 (S1901). The pair status change command includes a LDEV number which the first storage apparatus 20A comprises among LDEV pairs which are change targets of pair status. Hereinafter, the LDEV number will be referred to as "the target LDEV number" in the explanation of FIG. 19.

The first storage apparatus 20A identifies the HG number corresponding to the target LDEV number from the port management table 215A and changes the UA603 (refer to FIG. 5) corresponding to the identified HG number to "1" (the value signifying path priority change) (S1902). Also, the first storage apparatus 20A changes the UA synchronous flag bit 702 (refer to FIG. 5) corresponding to the target LDEV number to "1" (S1903).

The first storage apparatus 20A sends a response denoting the completion to the storage management server 11 (S1904).

In addition, the UA was changed to "1" in S1902, but with respect to the path priority change process, the pair partner storage apparatus (20B) will not be informed of the UA change. In a case where a UA transmission event such as receiving an I/O command by the first storage apparatus 20A has occurred (refer to FIG. 17), the pair partner storage apparatus (20B) is informed of the UA change.

FIG. 20 to FIG. 23 shows a flow of the path priority report process.

Figure 20:
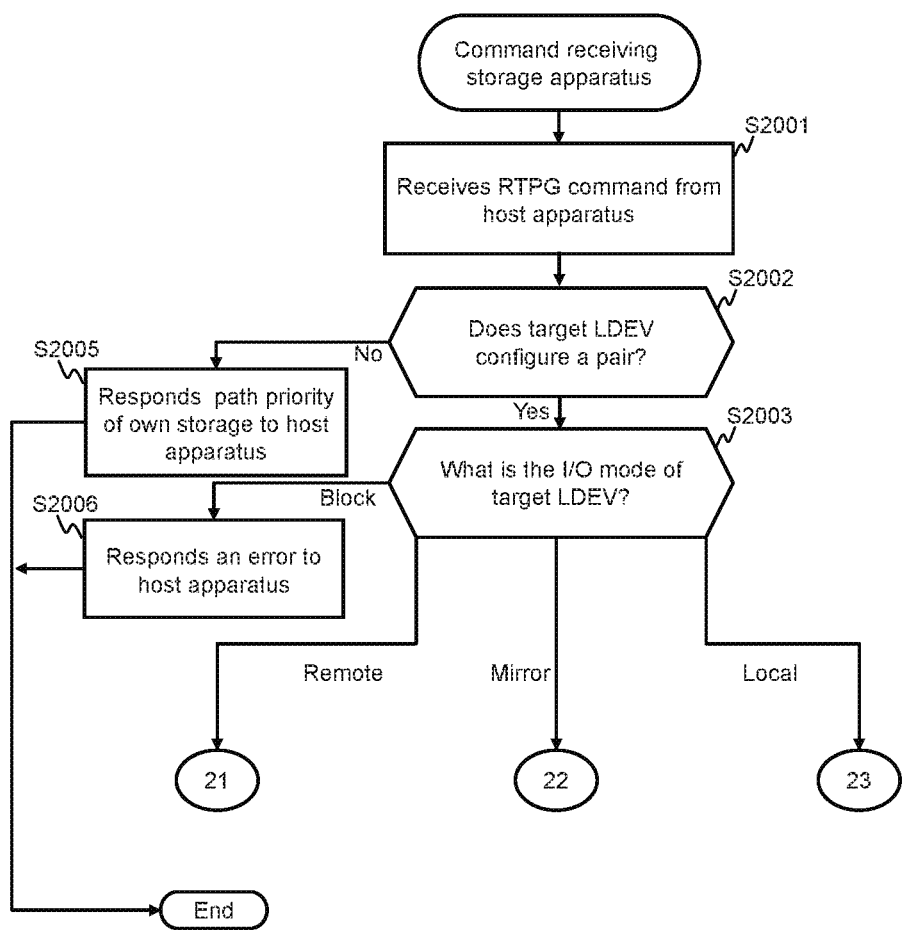
FIG. 20 shows a flow of the first part of a path priority report process.

As shown in FIG. 20, the first storage apparatus 20A receives a RTPG command from the host apparatus 10 (S2001). The RTPG command includes a LUN. The LUN, for example, is the same LUN as the LUN in an I/O command corresponded to a UA response. That is, when the host apparatus 10 received a UA response as the response of an I/O command, the host apparatus 10 can send a RTPG command including the same LUN as the LUN in the I/O command to the same storage apparatus as the sending-destination storage apparatus of the I/O command. In addition, the host apparatus 10 may send a RTPG command by responding to a different event (for example, on a regular basis) from the event that the UA response was received. Hereinafter, with respect to the explanation of FIG. 20 to FIG. 23, the LDEV (the LDEV which the first storage apparatus 20A comprises) corresponding to the LUN in the RTPG command will be referred to as "the target LDEV" and the number of the target LDEV will be referred to as "the target LDEV number".

The first storage apparatus 20A judges based on the pair management table 212A, whether or not the target LDEV configures a LDEV pair which becomes the basis of a VDEV (S2002). If the target LDEV number is in the pair management table 212A, the judgment result of S2002 is affirmative, and if the target LDEV number is not in the pair management table 212A, the judgment result of S2002 is negative.

In a case where the judgment result of S2002 is negative (S2002: No), the first storage apparatus 20A sends a response including the path priority in own storage apparatus (for example, the path priority identified from the tables which are not illustrated) to the host apparatus 10 (S2005).

In a case where the judgment result of S2002 is affirmative (S2002: Yes), the first storage apparatus 20A identifies an I/O mode corresponded to the target LDEV number from the pair management table 212A (S2003).

In a case where the I/O mode identified in S2004 is "Block", the first storage apparatus 20A sends an error response to the host apparatus 10 (S2006). In a case where the I/O mode identified in S2004 is "Remote", the first storage apparatus 20A performs the process shown in FIG. 21. In a case where the I/O mode identified in S2004 is "Mirror", the first storage apparatus 20A performs the process shown in FIG. 22. In a case where the I/O mode identified in S2004 is "Local", the first storage apparatus 20A performs the process shown in FIG. 23.

Figure 21:
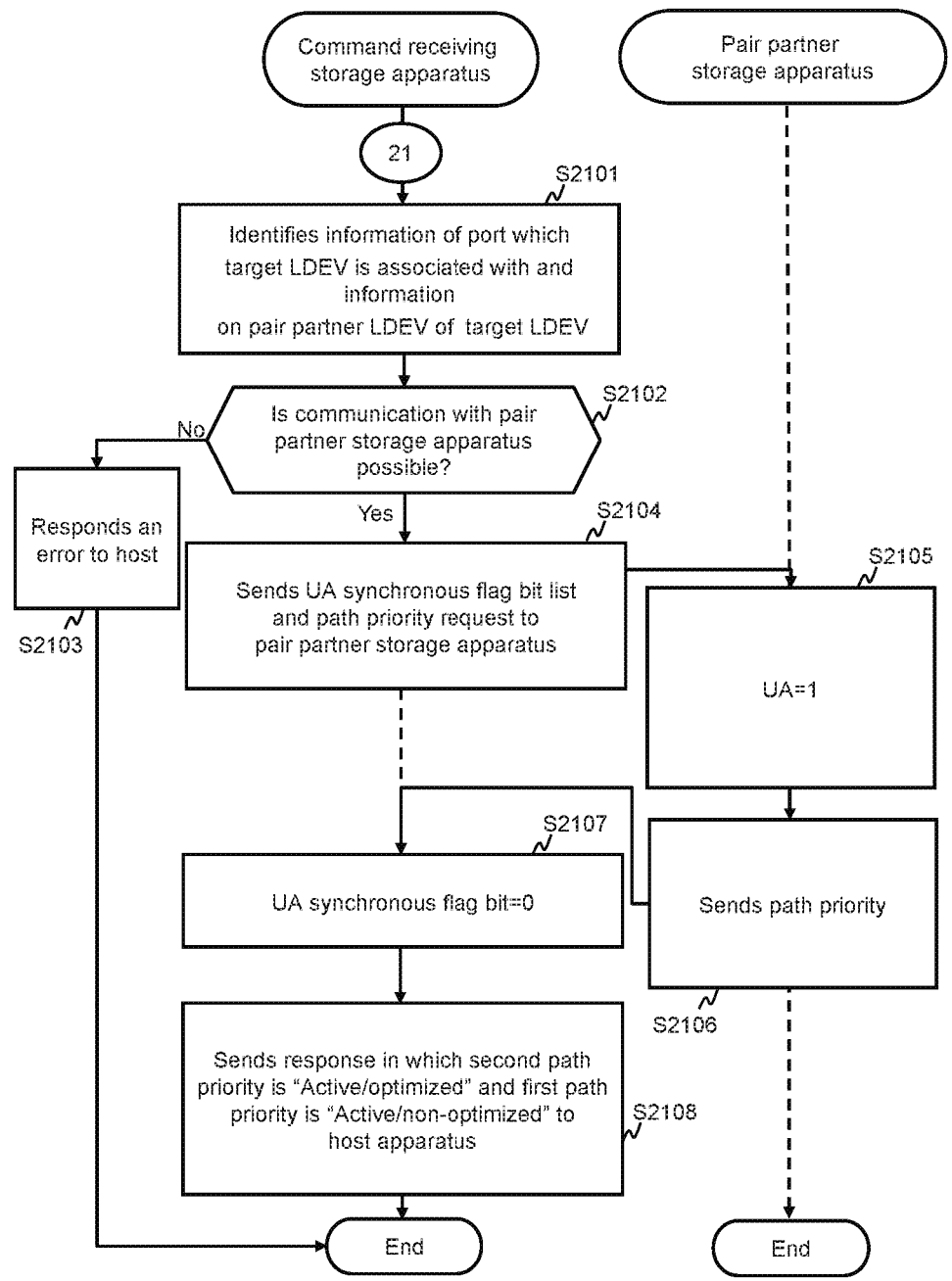
FIG. 21 shows a flow of the second part of a path priority report process.

As shown in FIG. 21, in a case where the I/O mode is "Remote", the first storage apparatus 20A identifies the information of all the ports associated with the target LDEV (for example, a port number and a relative port ID) and the information of the pair partner LDEV (the pair partner storage) of the target LDEV from a pair management table 212A, a relative port ID management table 217A, a virtual box management table 216A and a port management table 215A by using the target LDEV number (S2101). The information being identified (information of ports and information of pair partner LDEVs) is for example, a range of a virtual box including the target LDEV. This is the same in FIG. 22 (S2203) and FIG. 23 (S2303). Hereinafter, with respect to the explanation in FIG. 21 to FIG. 23, the pair partner storage apparatus of the target LDEV will be regarded as the second storage apparatus 20B.

The first storage apparatus 20A judges whether or not communication with the identified second storage apparatus 20B (the pair partner storage apparatus) is possible (S2102).

For example, the first storage apparatus 20A sends a predetermined command to the second storage apparatus 20B and judges whether or not a response comes back within a predetermined time.

In a case where the judgment result of S2102 is negative (S2102: No), the first storage apparatus 20A sends an error response to the host apparatus 10 (S2103).

In a case where the judgment result of S2102 is affirmative (S2102: Yes), the first storage apparatus 20A sends a UA synchronous flag bit list 223A and a path priority request to the second storage apparatus 20B (S2104).

The second storage apparatus 20B receives the target LDEV number, the UA synchronous flag bit list 223A and the path priority request. The second storage apparatus 20B identifies the HG numbers with respect to each of all the LDEVs in which the UA synchronous flag bit is "1" based on the received UA synchronous flag bit list 223A and changes the UA corresponding to the identified HG number to "1" (S2105). In addition, the second storage apparatus 20B informs the first storage apparatus 20A, by responding to the path priority request, of the path priority information which denotes the path priority (the path priority identified from the path management table 214B) of the HG number which is associated with the pair partner LDEV corresponded to the target LDEV (S2106).

When the first storage apparatus 20A received the path priority information from the second storage apparatus 20B, the first storage apparatus 20A changes all the UA synchronous flag bit "1" with respect to the UA synchronous flag bit list 223A to "0" (S2107) and sends a RTPG response including a report in which the first path priority (the path priorities with respect to one or more LDEVs including the target LDEV (the LDEVs in the first storage apparatus 20A)) and the second path priority (the path priorities with respect to one or more LDEVs including the pair partner LDEV (the LDEVs in the second storage apparatus 20B)) are merged, to the host apparatus 10 (S2108). However, in that report, the first path priority is regarded as "Active/non-optimized", regardless of the path priorities which the first path priority information (the information denoting the path priorities corresponding to the HG number of the target LDEV) comprised by the first storage apparatus 20A denotes, and second path priority is regarded as "Active/optimized", regardless of the path priorities which the second path priority information (the information denoting the path priorities corresponding to the HG numbers of the pair partner LDEVs) received from the second storage apparatus 20B denotes. Namely, the paths to pair partner LDEVs are made to be preferentially used thereafter. This is because, in a case where the I/O mode is "Remote", there is a possibility that data in the pair partner LDEV is newer than data in the target LDEV, and the data is reliable.

In addition, in S2104, it is not the whole UA synchronous flag bit list 223A, but UA synchronous flag bit of the target LDEV among the UA synchronous flag bit list 223A may be sent. Therefore, with respect to S2105, a UA change may be performed for only the HG number associated with the pair partner LDEV of the target LDEV. In addition, with respect to S2104, it is judged whether or not there is at least one UA flag bit "1" in the UA synchronous flag bit list 223A (or, whether or not the UA synchronous flag bit of the target LDEV is "1"), and in a case where the result of the judgment is affirmative, the UA synchronous flag bit list (or the UA synchronous flag bit of the target LDEV) is sent to the second storage apparatus 20B, and in a case where the result of the judgment is negative, the UA synchronous flag bit list (or the UA synchronous flag bit of the target LDEV) is not sent to the second storage apparatus 20B, and also S2105 may not be performed. This is the same with respect to FIG. 22 (S2206 and S2207) and FIG. 23 (S2306 and S2307).

Figure 22:
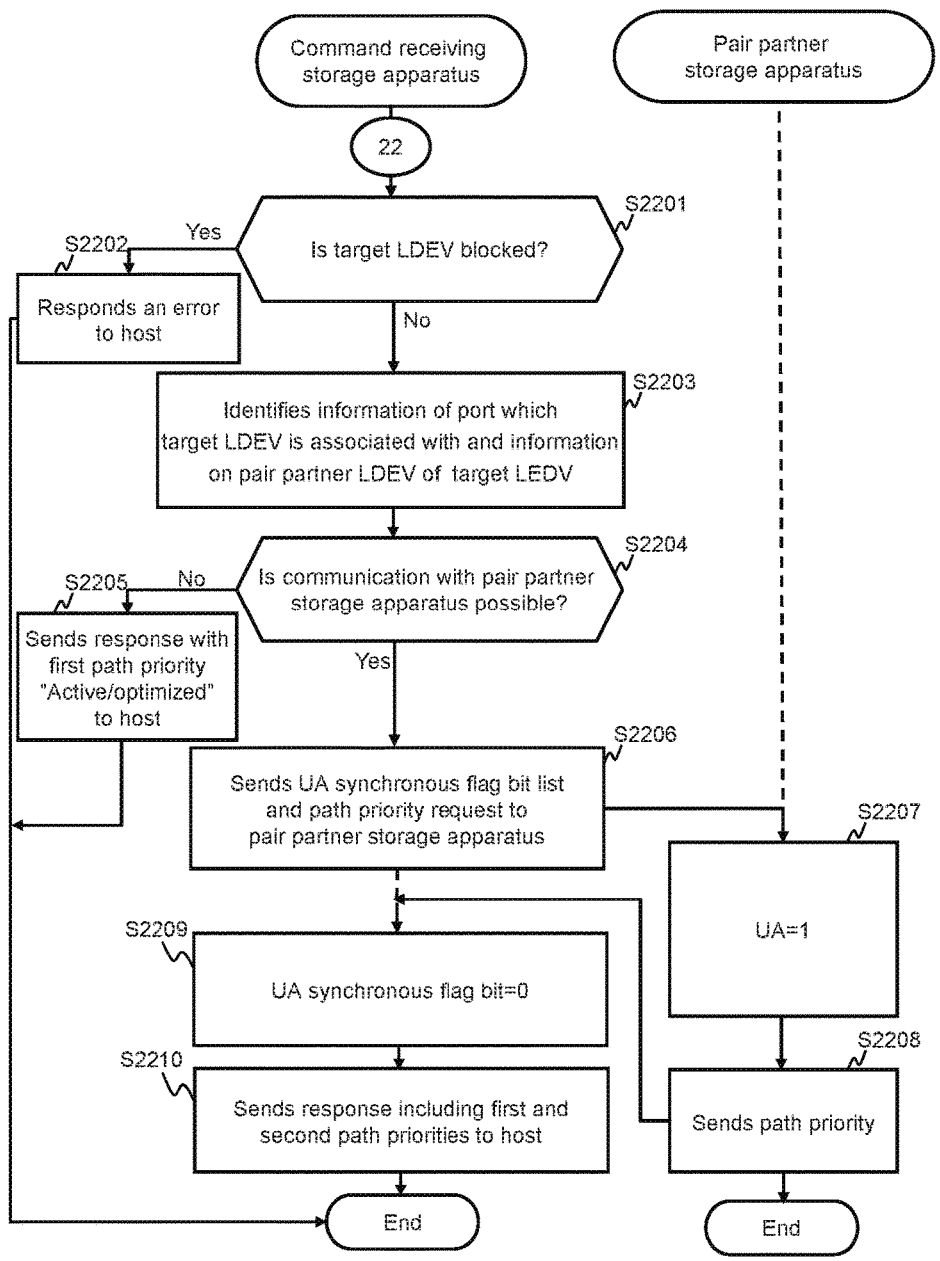
FIG. 22 shows a flow of the third part of a path priority report process.

As shown in FIG. 22, in a case where the I/O mode is "Mirror", the first storage apparatus 20A judges whether or not the target LDEV is blocked (S2201).

In a case where the judgment result of S2201 is affirmative (S2201: Yes), the first storage apparatus 20A sends an error response to the host apparatus 10 (S2202).

In a case where the judgment result of S2201 is negative (S2201: No), the first storage apparatus 20A performs the process same as S2101 in FIG. 21 (S2203).

The first storage apparatus 20A judges whether or not the first storage apparatus 20A can communicate with the identified second storage apparatus 20B (the pair partner storage apparatus) (S2204).

In a case where the judgment result of S2204 is negative (S2204: No), the first storage apparatus 20A, regardless of the path priorities which the first path priority information denote, sends a RTPG response including a report which treats a first path priority as "Active/optimized" to the host apparatus 10 (S2205). This is because, since it is not possible to communicate with the second storage apparatus 20B, paths to the target LDEV are made to be preferentially used thereafter.

In a case where the judgment result of S2204 is affirmative (S2204: Yes), The same processes as S2104 to S2107 shown in FIG. 21 are performed (S2206 to S2209). The first storage apparatus 20A sends a RTPG response including a report in which a first path priority and a second path priority are merged, to the host apparatus 10 (S2210). In the report, a first path priority is the same as the path priority which is denoted in the first path priority information that the first storage apparatus 20A comprises, and a second path priority is the same as the path priority which is denoted in the second path priority information received from the second storage apparatus 20B.

Figure 23:
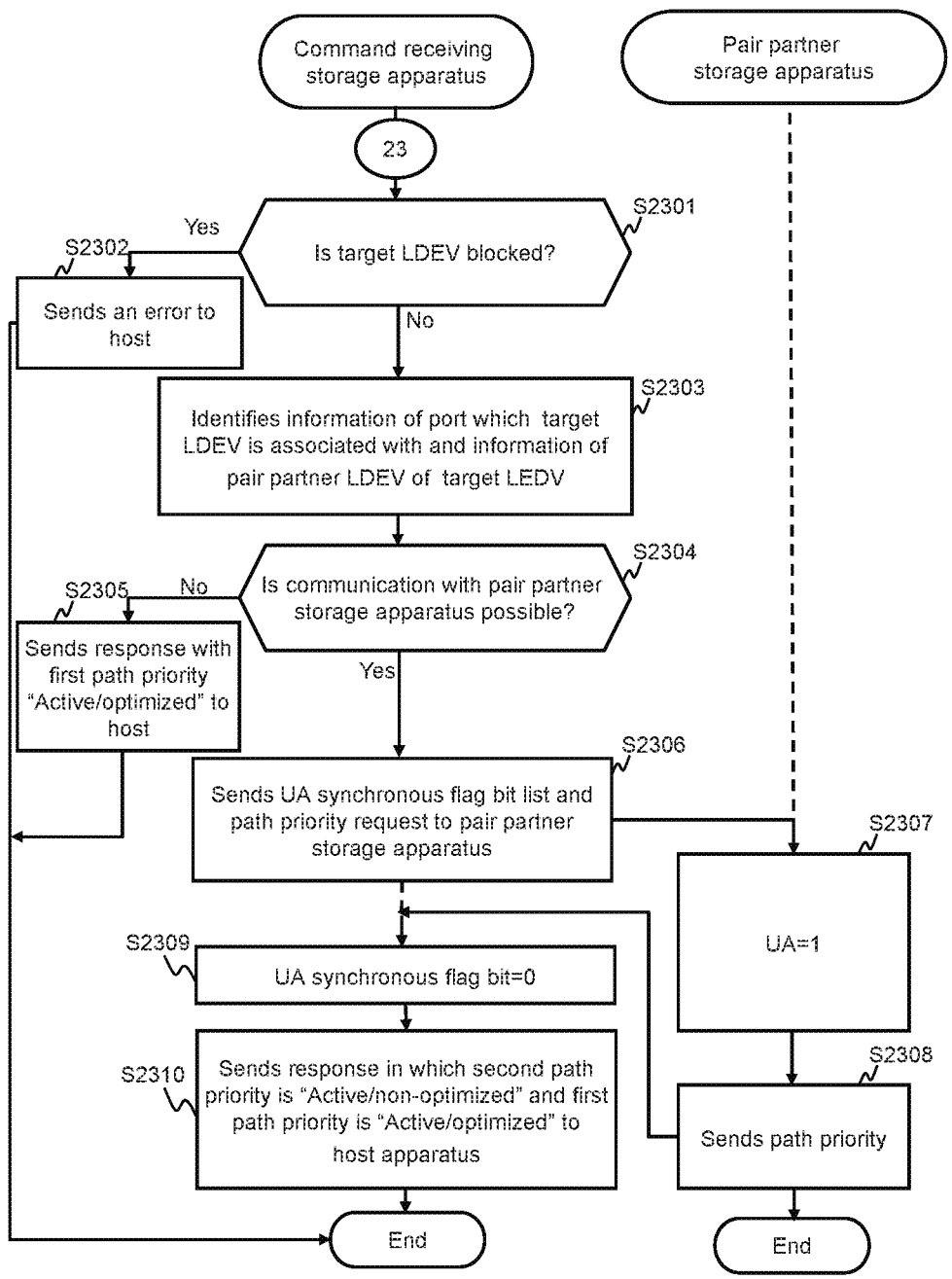
FIG. 23 shows a flow of the forth part of a path priority report process.

As shown in FIG. 23, in a case where I/O mode is "Local", the same process as S2201 to S2209 in FIG. 22 is performed (S2301 to S2309). The first storage apparatus 20A sends a RTPG response including a report in which a first path priority and a second path priority are merged, to the host apparatus 10 (S2310). However, in the report, the first path priority is regarded as "Active/optimized" regardless of path priorities denoted in the first path priority information which the first storage apparatus 20A comprises, and the second path priority is regarded as "Active/non-optimized" regardless of path priorities denoted in the second path priority information which was received from the second storage apparatus 20B. Namely, thereafter, the paths to the target LDEV are made to be preferentially used. This is because, in a case where the I/O mode is "Local", there is a possibility that data in the target LDEV is newer than data in the pair partner LDEV, and the data is reliable.

Embodiment 2

Embodiment 2 will be explained hereinafter. In so doing, the points of difference with Embodiment 1 will mainly be explained, and the explanations of the points in common with Embodiment 1 will be omitted or simplified.

First, the outline of Embodiment 2 will be explained.

When the number of host apparatuses 10 is larger, it is possible that the number of host groups will be increased. In that case, it will be time consuming to configure path priorities per host group unit.

Accordingly, in Embodiment 2, the time and labor to configure path priorities will be less compared to Embodiment 1. Specifically, in Embodiment 2, the administrator does not need to configure path priorities. A group is defined with one or more host apparatuses and one or more storage apparatuses. In the present embodiment, the group is called "data center". It is desirable that the physical distance between host apparatuses and storage apparatuses which belong to the same data center is shorter than the physical distance between host apparatuses and storage apparatuses which belong to a different data center.

An ID is assigned to each data center. The data center ID may be assigned by the administrator or users (users of a virtual box) or the like. The data center ID is respectively maintained by host apparatuses and storage apparatuses which belong to the data center that the data center ID was assigned. The host apparatus makes the path priority between the storage apparatuses in the same data center (the storage apparatuses which maintain the same data center ID as the data center ID maintained by the host apparatus) and the LDEVs in the storage apparatuses higher than the path priority between the storage apparatuses in a different data center (the storage apparatuses which maintain a different data center ID from the data center ID maintained by the host apparatuses) and the LDEVs in the storage apparatuses. Specifically, for example, the host apparatus 2410 decides the priority of the path between the LDEVs in the storage apparatuses 2420 which belong to the same data center to be "Active/optimized", and decides the priority of the path between the LDEVs in the storage apparatuses 2420 which belongs to different data centers to be "Active/non-optimized". The preceding, for example, can be expressed as described below.

A computer system, comprising.
at least one host apparatus, and
multiple storage apparatuses coupled to the multiple host apparatuses,
each of the multiple host apparatuses being configured to maintain an ID of the group to which the host apparatus belongs,
each of multiple storage apparatuses being configured to maintain an ID of the group to which the storage apparatus belongs,
at least one host apparatus and at least one storage apparatus belonging to each group,
each of the at least one host apparatus is configured to,
send an inquiry of ID to any of storage apparatuses,
receive a response including the group ID which is maintained by the storage apparatus of sending-destination of the inquiry as the response to the inquiry,
make each priority of one or more paths to all logical volumes which the sending-source storage apparatus of the response comprises, the first priority, if the group ID in the response is the same as the group ID maintained by the host apparatus, and make each priority of one or more paths to all logical volumes which the sending-source storage apparatus of the response comprises, the second priority which is lower than the first priority, if the group ID in the response is different from the group ID maintained by the host apparatus.

Figure 24:
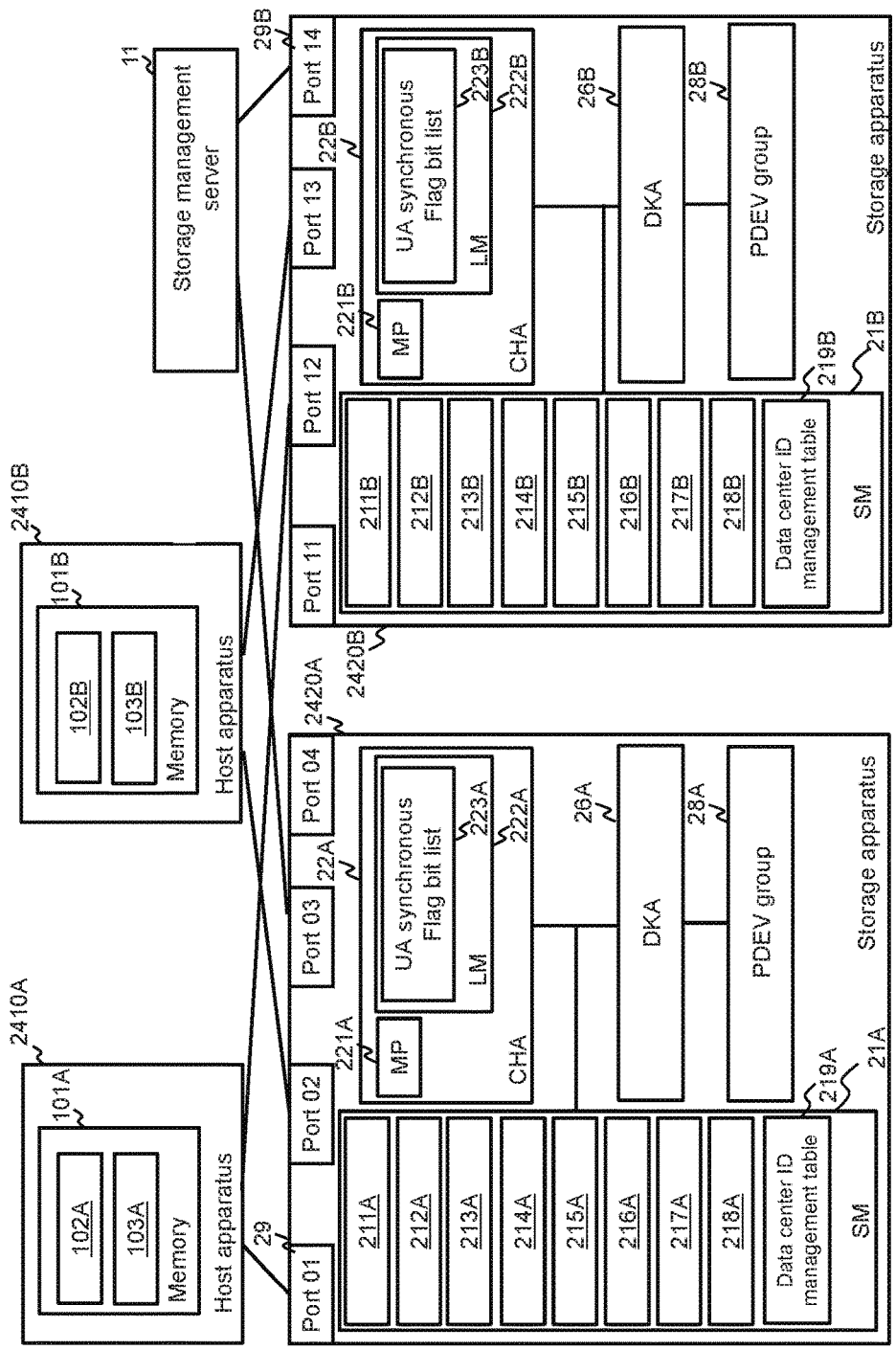
FIG. 24 shows a configuration of a computer system according to Embodiment 2, and the configuration of management information which each storage apparatus comprises.

FIG. 24 shows a configuration of the computer system according to Embodiment 2, and a configuration of the management information which each storage apparatus comprises.

There are multiple host apparatuses 2410 and multiple storage apparatuses 2420. In the examples in FIG. 24, there are a first and a second host apparatuses 2410A and 2410B, and a first and a second storage apparatuses 2420A and 2420B Hereinafter, in order to make the explanation easy to understand, it will be regarded as the first host apparatus 2410A and the first storage apparatus 2420A belong to a first data center, and the second host apparatus 2410B and the second storage apparatus 2420B belong to a second data center.

The host apparatus 2410 receives a response including a data center ID maintained by the storage apparatus 2420 from the storage apparatus 2420, by sending a data center ID inquiry to the storage apparatus 2420. The data center ID inquiry may be of, for example, the configuration shown in FIG. 25. That is, the data center ID inquiry may comprise an operation code field and a data center ID field. The operation codes are written in the operation code field. The operation code is a code denoting a kind of command that wants to make the storage apparatus which received the inquiry execute. Also, the data center ID field with respect to data center inquiries may be blank and, in case of the response, the data center ID maintained by the storage apparatus 2420 which received the inquiry is written in the response by the storage apparatus 2420, and a response including the structure of the inquiry as illustrated (the response including the structure that the data center ID is written) is returned to the host apparatus 2410 from the storage apparatus 2420.

The host apparatus 2410 comprises a memory 101 as an example of storage devices. The memory 101 stores a path priority management table 102. The path priority management table 102, for example, as shown in FIG. 26, comprises, per storage apparatus, a storage serial number (serial number of storages) 2601, a path status 2602 and a path priority 2603. Namely, in the present embodiment, the configuration of path priorities is performed per storage apparatus unit. That is, with respect to multiple paths corresponding to multiple LDEVs in one storage apparatus which the host apparatus 2410 can access, the path priorities are configured altogether. In addition, the storage serial number 2601 is an example of the ID for storage apparatuses. There are "Normal" (communicable with storage apparatuses) and "Blocked" (not communicable with storage apparatuses) as the values of the path status 2602. The host apparatus 2410, even though the path priority with respect to the storage apparatus with the path status "Blocked" is "Active/optimized", does not use the path but uses a path with respect to another storage apparatus with the path status "Normal".

In addition, the memory 101 of the host apparatus 2410 stores a data center ID management table 103, and the storage apparatus 2420 (for example, SMs 21) also stores a data center ID management table 219. The tables 103 and 219 respectively have the same configuration, and also the value that the tables 103 and 219 in the same data center maintain is the same. Specifically, the first host apparatus 2410A and the first storage apparatus 2420A belong to the first data center, and the tables 103A and 219A maintain the same data center ID "0x0001" as shown in FIG. 27A. Similarly, the second host apparatus 2410B and the second storage apparatus 2420B belong to the second data center, and the tables 103B and 219B maintain the same data center ID "0x0002" as shown in FIG. 27B.

Hereinafter, processes performed in Embodiment 2 are explained.

Figure 28:
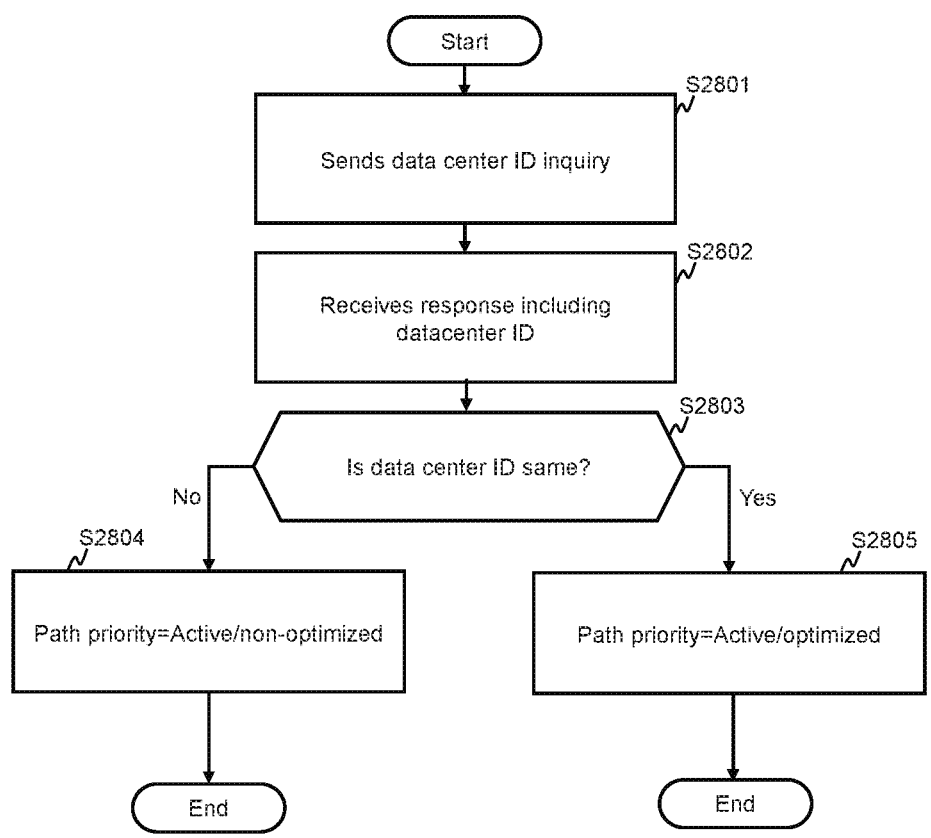
FIG. 28 shows a flow of a path priority automatic decision process.

FIG. 28 shows a flow of a path priority automatic determination process. Furthermore, the process can be performed by a path management program (refer to FIG. 30) in the host apparatus 2410. Also, the host apparatus 2410A will be mainly referred to as an example of the process.

The host apparatus 2410A sends a data center ID inquiry to the storage apparatus 2420 (S2801) and receives a response including the data center ID which the storage apparatus 2420 maintains from the storage apparatus 2420 (S2802).

The host apparatus 2410A judges whether or not the data center ID in the received response and the data center ID in the data center ID management table 103A are the same (S2803).

In a case where the judgment result of S2803 is negative (S2803: No), it signifies that the storage apparatus of the sending-source of the response received in S2802 belongs to a data center which is different from the host apparatus 2410A. In this case, the host apparatus 2410A configures "Active/non-optimized" as the path priority 2603 with respect to the sending-source storage apparatus of the response received in S2802 (S2804). This is the process performed in a case where the sending-source storage apparatus of the response is the storage apparatus 2420B.

Alternatively, in a case where the judgment result of S2803 is affirmative (S2803 : Yes), it signifies that the sending-source storage apparatus of the response received in S2802 belongs to the same data center as the host apparatus 2410A. In this case, the host apparatus 2410A configures "Active/optimized" as the path priority 2603 with respect to the sending-source storage apparatus of the response received in S2802 (S2805). This is the process performed in a case where the sending-source storage apparatus of the response is the storage apparatus 2420A.

Figure 29:
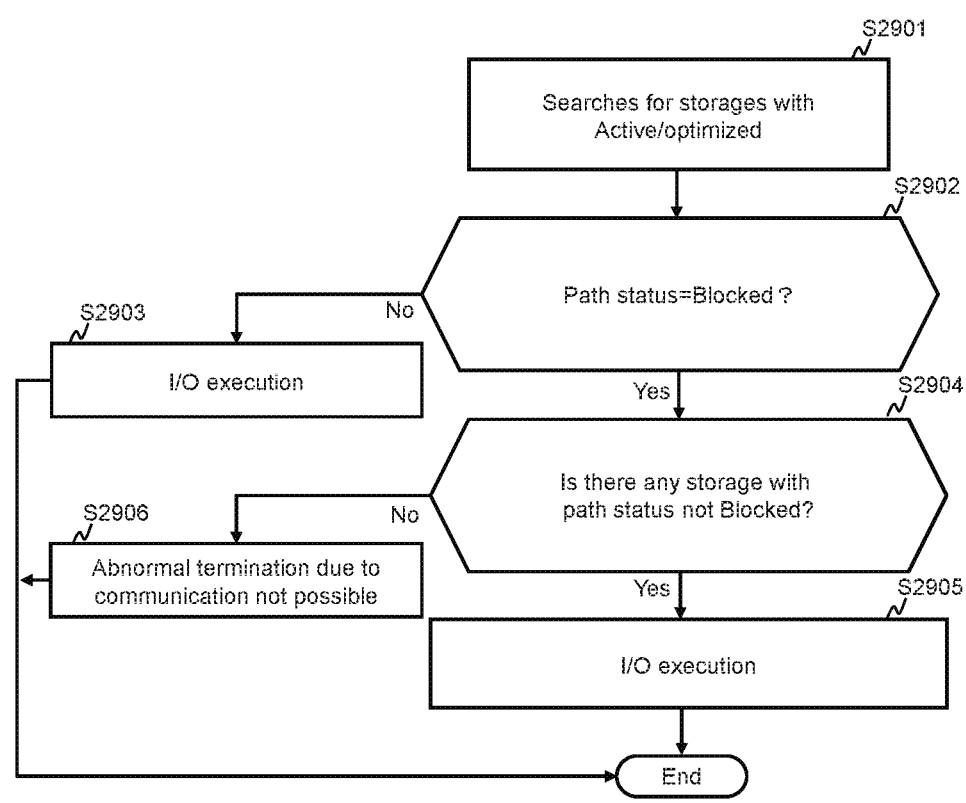
FIG. 29 shows the flow of an I/O control process.

FIG. 29 shows a flow of an I/O control process. This process can be performed by a path management program in the host apparatus 2410. Also, the host apparatus 2410A will be mainly referred to as an example of the process. This process is performed, for example, when the path management program was instructed on I/O to VDEVs by application programs.

The host apparatus 2410A searches for storage apparatuses in which the path priority 2603 is "Active/optimized" from the path priority management table 102A (S2901). The host apparatus 2410A judges, whether or not the path status 2602 of the storage apparatus found by the search is being "Blocked" (S2902).

In a case where the judgment result of S2902 is negative (S2902: No), the host apparatus 2410A selects the paths to the LDEVs which are the basis of an I/O-destination VDEV and which are of the found storage apparatus, and sends an I/O command using the selected path (S2903).

In a case where the judgment result of S2902 is affirmative (S2902: Yes), the host apparatus 2410A judges whether or not there are storage apparatuses of the path status 2602 being not "Blocked" based on the path priority management table 102A (S2904).

In a case where the judgment result of S2904 is affirmative (S2904: Yes), the host apparatus 2410A selects the paths to the LDEVs which are the basis of the I/O-destination VDEV and which are any of storage apparatuses of the path status 2602 being not "Blocked", and sends an I/O command using the selected path (S2905). If there are both a storage apparatus of path priority 2603 being "Active/optimized" and a storage apparatus of the path priority 2603 being "Active/non-optimized" as storage apparatuses of the path status 2602 being not "Blocked", the storage apparatus of the path priority 2603 being "Active/optimized" will be selected.

In a case where the judgment result of S2904 is negative (S2904: No), the host apparatus 2410A performs an abnormal termination (for example, issuing an error) due to communication being not possible (S2906).

As above, some embodiments and variations are explained but the present invention is not limited to these embodiments and variations, and it goes without saying that various alterations are possible within the range of not deviating from the substance. For example, the present invention, not limiting to ALUA, can be applied to a system under the environment that a host system can acknowledge status changes by means of a storage apparatus informing a status change to the host system.

REFERENCE SIGNS LIST

10: Host apparatus
20A: First storage apparatus
20B: Second storage apparatus

The invention claimed is:

1. A storage system, coupled to a host system, comprising:
multiple storage apparatuses which manage multiple kinds of multiple resources including multiple logical volumes, and provide the host system with a virtual volume which is a logical volume in which the multiple logical volumes are virtualized into one,
in a case where a first storage apparatus which is any one of the storage apparatuses in the multiple storage apparatuses has detected a first event, the first storage apparatus being configured to change the status of a first resource, the first resource being at least one of, a first logical volume which is a logical volume that the first storage apparatus comprises among the multiple logical volumes which are basis of the virtual volume and a resource which the first storage apparatus manages relating to the first logical volume,
in a case where the first storage apparatus has detected a second event which signifies that the host system can be informed, in the future, of the status of the first resource, the first storage apparatus being configured to send a status change notice which is a notice of a status change with respect to the first logical volume to a second storage apparatus, the second storage apparatus being a storage apparatus comprising a second logical volume, the second logical volume being the basis of the virtual volume and being a logical volume associated with the first logical volume, and
the second storage apparatus being configured to receive the status change notice and configure the status change based on the received status change notice.

2. The storage system according to claim 1, wherein
the multiple resources include multiple ports,
the first resource is a first path which is a path to the first logical volume and which goes through a path with which the first logical volume is associated,
each of the multiple storage apparatuses is configured to maintain the information which denotes the status of a path which the storage apparatus manages, but not to maintain the information which demotes the status of a path which storage apparatuses other than the storage apparatus manage, and
a status change based on the status change notice is configured with respect to the second logical volume, in the second storage apparatus.

3. The storage system according to claim 2, wherein
the first storage apparatus is configured to configure a status change with respect to the first logical volume in a case where the first storage apparatus has detected the first event, the detection of the second event is receiving of an I/O command which specifies the virtual volume, in a case where the second storage apparatus has configured a status change based on the received status change notice, the second storage apparatus is configured to send a completion response to the first storage apparatus, and the first storage apparatus is configured to send a response of the I/O command including the status change configured with respect to the first logical volume, to the host system, in a case where the first storage apparatus has received the completion response.

4. The storage system according to claim 3, wherein the first storage apparatus is configured to, receive a predetermined kind of inquiry related to the virtual volume from the host system which received the response including a status change that is configured with respect to the first logical volume, send a request of status of a path associated with the second logical volume to the second storage apparatus which comprises the second logical volume which configures a pair with the first logical volume, receive path status information which includes information denoting the status of one or more paths associated with the second logical volume from the second storage apparatus which received the request, and send a response of the inquiry which includes a first path status denoting status of one or more paths including the first path associated with the first logical volume and a second path status which is the status of one or more paths associated with the second logical volume to the host system.

5. The storage system according to claim 4, wherein the first storage apparatus is configured to control the first path status and the second path status included in the response of the inquiry, in accordance with pair status and I/O status with respect to the first logical volume and the second logical volume.

6. The storage system according to claim 5, wherein the first path status denotes a first priority which is the priorities of the one or more paths associated with the first logical volume, the second path status denotes a second path priority which is the priorities of the one or more paths associated with the second logical volume, and the first storage apparatus is configured to, regard the first path priority as the priority which is denoted by the information that the first storage apparatus maintains and denotes the priority of the one or more paths associated with the first logical volume, if the pair status and the I/O status denote that the first logical volume and the second logical volume are in the synchronous status, regard the second path priority as the priority that the received path status information denotes, make the second path priority higher than the first path priority, if the pair status and the I/O status denote that the first logical volume and the second logical volume are in suspended status and data in the second logical volume is newer than data in the first logical volume, and make the first path priority higher than the second path priority, if the pair status and the I/O status denote that the first logical volume and the second logical volume are in suspended status and data in the first logical volume is newer than data in the second logical volume.

7. The storage system according to claim 6, wherein the first storage apparatus, in a case where communication with the second storage apparatus is impossible, is configured to send an error response to the host system, if the pair status and I/O status denote that the first logical volume and the second logical volume are in suspended status and data in the second logical volume is newer than data in the first logical volume, and send a response of the inquiry including an intention to make the first path priority higher than the second path priority to the host system, if the pair status and the I/O status denotes that the first logical volume and the second logical volume are in synchronous status, or the first logical volume and the second logical volume are in suspended status and data in the first logical volume is newer than data in the second logical volume.

8. The storage system according to claim 2, wherein the status change is UA (Unit Attention) according to ALUA (Asymmetric Logical Unit Access), multiple target port groups associated with the virtual volume are defined on each of the multiple storage apparatuses, and the multiple target port groups are sets of one or more ports.

9. The storage system according to claim 2, wherein the first event is an event which can have influence on two or more logical volumes including at least the first logical volume among multiple logical volumes that the first storage apparatus comprises, the second event is an event with respect to the first logical volume, and the first storage apparatus is configured to regard a status change notice which is sent in the case of detecting the second event as a status change notice with respect to the first logical volume among the two or more logical volumes, even though it has changed each status of multiple paths including the first path by responding to the first event.

10. The storage system according to claim 2, wherein the first storage apparatus is configured to configure a status change with respect to the first logical volume in the case of detecting the first event, detection of the second event is receiving of a predetermined kind of inquiry related to the virtual volume, and the first storage apparatus, which received the inquiry, is configured to, send the status change notice and a request of status of a path associated with the second logical volume to the second storage apparatus which comprises the second logical volume which configures a pair with the first logical volume, receive a path status information including information which denotes status of one or more paths associated with the second logical volume from the second storage apparatus which received the request, and send a response of the inquiry including a first path status which denotes the status of one or more paths including the first path associated with the first logical volume and a second path status which is the status of one or more paths associated with the second logical volume to the host system.

11. The storage system according to claim 2, wherein
one or more host systems are configured with multiple host apparatuses,
each of the multiple host apparatuses is configured to maintain an ID of the group to which the host apparatuses belong,
each of the multiple storage apparatuses is configured to maintain an ID of the group to which the storage apparatuses belong,
at least one host apparatus and at least one storage apparatus belong to each group,
in a case where the first storage apparatus has received an inquiry of group ID from a first host apparatus which is any one of host apparatuses coupled to the first storage apparatus, the first storage apparatus is configured to send a response including a group ID maintained by the first storage apparatus to the first host apparatus,
the first host apparatus is configured to,
make each priority of one or more paths including the first path which are associated with one or more logical volumes including the first logical volume that the first storage apparatus comprises, the first priority, if a group ID in the response is the same as the group ID maintained by the first host apparatus, and
make each priority of the one or more paths, the second priority,
which is lower than the first priority, if a group ID in the response is different from the group ID maintained by the first host apparatus.

12. The storage system according to claim 1, wherein
the detection of the second event is at least one of, receiving of an I/O command specifying the virtual volume and sending of predetermined kind of inquiry related to the virtual volume, and
in a case where the first storage apparatus has received an I/O command specifying the virtual volume from the host system while managing status changes with respect to the first logical volume, the first storage apparatus is configured to send a response of the I/O command including a status change to the host system.

13. The storage system according to claim 1, wherein
each of the multiple storage apparatuses is configured to maintain the information denoting the status of resources which the storage apparatuses manage, but not to maintain the information which denotes the status of resources managed by storage apparatuses other than the storage apparatus, and
the first storage apparatus, in a case where the first storage apparatus has received a predetermined kind of inquiry related to the virtual volumes, is configured to
send a request of status of a second resource to the second storage apparatus which comprises the second logical volume which configures a pair with the first logical volume, receives a path status information including information which denotes the status of the second resource, from the second storage apparatus which received the request, and the second resource is a resource associated with the first resource and is at least one of, the second logical volume and the resource which the second storage apparatus manages relating to the second logical volume, and
send a response of the inquiry including status of the first resource and status of the second resource to the host system.

14. The storage system according to claim 1, wherein
the first event is an event which can have influence on two or more logical volumes which include at least the first logical volume among multiple logical volumes that the first storage apparatus comprises,
the second event is an event with respect to the first logical volume, and
the first storage apparatus is configured to regard a status change notice which is sent in the case of having detected the second event, as the status change notice with respect to the first logical volume among the two or more logical volumes, even though each status of multiple resources including the first resource is changed by responding to the first event.

15. A notice control method with respect to a storage system comprising multiple storage apparatuses which manage multiple kinds of multiple resources including multiple logical volumes and provide a host system with a virtual volume which is a logical volume in which the multiple logical volumes are virtualized into one,
when detecting a first event, by a first storage apparatus which is any one of the storage apparatus among the multiple storage apparatuses, changing a status of a first resource by the first storage apparatus, the first resource being at least one of, a first logical volume, which is a logical volume which the first storage apparatus comprises among the multiple logical volumes that are the basis of the virtual volume, and a resource which the first storage apparatus manages relating to the first logical volume,
when, by the first storage apparatus, detecting a second event which signifies that the host apparatus is informed, in the future, of the status of the first resource, sending, by the first storage apparatus, a status change notice which is a notice of a status change with respect to the first logical volume, to the second storage apparatus, the second storage apparatus being a storage apparatus which comprises a second logical volume, the second logical volume being the basis of the virtual volume and being a logical volume associated with the first logical volume, and
receiving, by the second storage apparatus, the status change notice and configuring, by the second storage apparatus, the status change based on the received status change notice.

* * * * *